(12) United States Patent
Panziera

(10) Patent No.: US 9,291,083 B2
(45) Date of Patent: Mar. 22, 2016

(54) MEMBRANE-BASED EXHAUST GAS SCRUBBING METHOD AND SYSTEM

(71) Applicant: IONADA INCORPORATED, Concord (CA)

(72) Inventor: Edoardo Panziera, Concord (CA)

(73) Assignee: IONADA INCORPORATED, Concord, Ontario (CA)

(*) Notice: Subject to any disclaimer, the term of this patent is extended or adjusted under 35 U.S.C. 154(b) by 0 days.

(21) Appl. No.: 14/745,079

(22) Filed: Jun. 19, 2015

(65) Prior Publication Data

US 2015/0300231 A1 Oct. 22, 2015

Related U.S. Application Data

(63) Continuation of application No. PCT/CA2014/050359, filed on Apr. 8, 2014.

(60) Provisional application No. 61/835,288, filed on Jun. 14, 2013.

(51) Int. Cl.
*B01D 46/46* (2006.01)
*B01D 53/30* (2006.01)
(Continued)

(52) U.S. Cl.
CPC *F01N 9/00* (2013.01); *B01D 53/22* (2013.01); *B01D 53/228* (2013.01); *B01D 61/246* (2013.01); *B01D 61/28* (2013.01); *B01D 61/32* (2013.01); *B01D 63/02* (2013.01); *B01D 63/04* (2013.01); *B01D 65/06* (2013.01); *B01D 71/024* (2013.01); *B01D 2053/224* (2013.01);
(Continued)

(58) Field of Classification Search
CPC .......... F01N 9/00; B01D 53/22; B01D 63/02; B01D 65/06; B01D 2053/224; B01D 2311/106; B01D 2311/18; B01D 2317/04; B01D 2321/162; B01D 2332/164
See application file for complete search history.

(56) References Cited

U.S. PATENT DOCUMENTS 5,960,777 A * 10/1999 Nemser ................ B01D 53/228
123/26
6,156,096 A * 12/2000 Sirkar .................... B01D 53/22
95/44
(Continued)

FOREIGN PATENT DOCUMENTS

| CN | 101091873 A1 | 12/2007 |
|---|---|---|
| CN | 101104130 A1 | 1/2008 |
| CN | 102485320 A1 | 6/2012 |

OTHER PUBLICATIONS

English Translation of CN10248532 Jun. 6, 2012.*
(Continued)

*Primary Examiner* — Amber R Orlando
(74) *Attorney, Agent, or Firm* — Kramer & Amado P.C.

(57) ABSTRACT

Various exemplary embodiments relate to a method and apparatus to reduce emissions of target emission gasses such as sulfur oxides, nitrogen oxides, and carbon oxides from combustion exhaust such as marine engine exhaust by gas membrane separation and liquid carrier chemical absorption. The membrane separation system consists of an absorption system containing semi-permeable hollow fiber membranes through which is circulated a liquid absorbent. Exhaust gases contact the exterior surface of the membranes and the target gasses selectively permeate the membrane wall and are absorbed by the liquid carrier(s) within the bore and thereby are removed from the exhaust stream.

8 Claims, 18 Drawing Sheets

(51) Int. Cl.
| | | |
|---|---|---|
| F01N 9/00 | (2006.01) | |
| B01D 53/22 | (2006.01) | |
| B01D 63/04 | (2006.01) | |
| B01D 61/24 | (2006.01) | |
| B01D 61/28 | (2006.01) | |
| B01D 61/32 | (2006.01) | |
| B01D 71/02 | (2006.01) | |
| B01D 63/02 | (2006.01) | |
| B01D 65/06 | (2006.01) | |

(52) U.S. Cl.
CPC ....... *B01D2311/106* (2013.01); *B01D 2311/18* (2013.01); *B01D 2317/04* (2013.01); *B01D 2321/162* (2013.01); *B01D 2321/164* (2013.01)

(56) References Cited

U.S. PATENT DOCUMENTS

| | | | | |
|---|---|---|---|---|
| 6,582,496 | B1* | 6/2003 | Cheng | B01D 53/22 95/45 |
| 7,537,200 | B2* | 5/2009 | Glassford | B01D 61/246 261/102 |
| 7,717,405 | B2* | 5/2010 | Parekh | B01D 19/0031 210/321.81 |
| 2004/0251010 | A1* | 12/2004 | Doh | B01D 63/02 165/172 |
| 2007/0214957 | A1* | 9/2007 | Feron | B01D 19/0031 95/46 |
| 2009/0015009 | A1* | 1/2009 | Spiegelman | F16L 13/141 285/335 |
| 2012/0055385 | A1* | 3/2012 | Lien | B01D 53/226 110/345 |
| 2013/0042763 | A1* | 2/2013 | Schirrmeister | B01D 53/22 96/10 |
| 2013/0189753 | A1* | 7/2013 | Pearlman | C12P 5/02 435/167 |
| 2013/0333354 | A1* | 12/2013 | Hamad | B01D 53/22 60/274 |

OTHER PUBLICATIONS

English Translation of CN101091873 Dec. 26, 2007.*
"International Search Report for PCT/CA2014/050359 dated Jul. 9, 2014".
"Exhaust Gas Scrubber Systems, Status and Guidelines", ABS, retrieved from [http://ww2.eagle.org/content/dam/eagle/publications/2013/Scrubber_Advisory.pdf.] viewed on Aug. 5, 2015.
"Molecular Sieving Hollow Fiber Ceramic Membrandes for Reverse osmosis/Nonofiltration Applications", Water Treatment Technology Program Report No. 40, Feb. 1997, US Department of Interior.
"PureSOx 2.0 product brochure", Alfa Laval; retrieved from [http://www.alfalaval.com/microsites/puresox/documents/MDD00107EN_LOWRES.pdf.] on Aug. 5, 2015.
"Wartsila SOx Scrubber System brochure", Wartsila Corporation, 2012.
Abedini, et al., "Application of Membrande in Gas Separation Processes: Its Suitability and Mechanishm", Petroleum & Coal (52)2 69-80, 2010.
Andreasen, et al., "Use of Seawater Scrubbing for SO2 Removal from Marine Engine Exhaust Gas", Energy Fuels, 2007, 21 (6), pp. 3274-3279.
Bredesen, et al., "High-temperature membranes in power generation with CO2 capture", Chemical Engineering and Processing 43 (2004) 1129-1158.
Caiazzo, et al., "Seawater So2 Scrubbing in a Spray Tower for Marine Application", XXXV Meeting of the Italian Section of the Combustion Institute, retrieved from [http://www.combustion-institute.it/proceedings/XXXV-ASICI/papers/35proci2012.VI14.pdf] on Aug. 5, 2015.
Chang, et al., "SO2 Absorption Into Aqueous Solutions", AIChe Journal, vol. 27, No. 2, pp. 292-298, Mar. 1981.
Dortmundt, et al., "Recent Developments in CO2 Removal Membrane Technology", 1999 UOP LLC, retrieved from [http://www.flargent.com/DocDownload.php?filename=CO2RemovalMembrane134.pdf] on Aug. 5, 2015.
Jiang, et al., "SO2 Gas Separation using Supported Ionic Liquid Membranes", J. Phys. Chem. B, 2007, 111 (19), pp. 5058-5061.
Karoor, et al., "Gas Absorption Studies in Microporous Hollow Fiber Membrane Modules", Ind. Eng. Chem, Res. 1993, 32, 674-684.
Klaassen, "Flue Gas Desulphurisation. New opportunities with Membrane Gas Absorption", Separation Technology. TNO I Knowledge for business. IT-A 007e/18-02-2005; retrieved from [http://www.polymer-services.com/FGD.pdf] on Aug. 5, 2015.
Klaassen, "Industrial Gas Treatment", Separation technology, TNO Science and Industry, IT-A 013e/18-02-2005.
Marjani, et al., "CFD Simulation of SO2 Removal from gas Mixtures using Ceramic Membranes", World Academy of Science, Engineering and Technology 58 2011.
Nguyen, "Lecture Notes: CH 3-2e", retrieved from {https://www.cpp.edu/~tknguyen/che313/pdf/chap3-2e.pdf] on Aug. 5, 2015.
Van Glasow, "Modeling the chemical effects of ship exhaust in the cloud-free marine boundary layer", Atmos. Chem. Phys., 3, 233-250, 2003.
Wang, et al., "Transport Membrane Condenser for Water and Energy Recovery from Power Plant Flue Gas", Final Technical Report, Oct. 1, 2007 to Mar. 31, 2012, Gas Technology Institute. Retrieved from {https://netl.doe.gov/File%20Library/Research/Coal/ewr/water/5350-FinalTechReport.pdf] on Aug. 8, 2015.
Zhang, et al., "Experimental Study of the Effect of Membrane Porosity on Membrande Absorption Process", Separation Science and Technology, 41: 3245-3263, 2006.
"Innovative Membrane Technologies for Reducing NOx Emissions and Preventing Transformer Failures", Compact Membrane Systems, Inc.EPA SBIR Success Stories, May 24, 2013.
Ciora, Jr., et al., "Ceramic Membranes for Environmental Related Applications", Fluid/Particle Separation Journal, Jul. 2003, vol. 15, No. 1, pp. 51-60.
Huang, "Modeling Sulfur Dioxide Absorption by Fine Water Spray", Journal of Environmental Science and Health, Part A: Toxic/Hazardous Substances and Environmental Engineering, Feb. 2005, 40:11, 2027-2039.

* cited by examiner

MEMBRANE-BASED EXHAUST GAS SCRUBBING METHOD AND SYSTEM

CROSS-REFERENCE TO RELATED APPLICATIONS

This application is a continuation co-pending PCT application No. PCT/CA2014/050359 filed on Apr. 8, 2014, which claims priority to U.S. Provisional Application No. 61/835,288, filed on Jun. 14, 2013, the entire disclosures of which are incorporated herein by reference.

TECHNICAL FIELD

The invention relates to processing of combustion gasses to remove contaminants such as oxides of sulfur, nitrogen and carbon. The invention has particular application to treating exhaust from combustion engines such as marine diesel engines.

BACKGROUND

Marine diesel engines power the majority of ships used for marine transportation. These engines typically burn Heavy Fuel Oil (HFO), which contains high concentrations of sulfur and other impurities. The combustion process produces high concentrations of sulfur oxides (SOX), nitrogen oxides (NOX), carbon oxides (COX) such as $CO_2$, and other gases that are subject to increasing restrictions with new emerging emissions requirements.

One approach to reducing marine engine emissions is to switch to higher purified fuels, or distillates. These distillates are more expensive than HFO. An alternative is to post-treat, clean, or scrub the combustion exhaust gasses before they are discharged into the atmosphere.

Sea water scrubbers have been developed as a post-treatment solution to clean marine engine exhaust. A commonly used process is to spray aqueous alkaline or ammonia sorbents into the exhaust stream. However, these 'wet' sea water scrubbers can require large amounts of water and consequently generate large amounts of waste water, which can include metal salts such as calcium sulfate, soot, oils, and heavy metals. This can produce a toxic sludge that requires complex on board water treatment, and as well as disposal of sludge at designated ports. The resultant system is large, complex, expensive and energy intensive, increasing ship fuel consumption by as much as three percent. Although conventional sea water scrubber systems may be well suited for fixed land based power plants, they are simply too large and complex to operate efficiently in a marine application. As well, such systems may not be well suited to removing $CO_2$ from marine engine exhaust.

Treatment of marine exhaust could in principle be accomplished by modifying existing land-based technology to bubble marine exhaust gases through an ionic liquid. However, this approach may not be practical due to the high flow rates of marine exhaust and the resultant large volume of ionic liquid required, in light of the space and weight constraints of a marine vessel. The energy required to compress the exhaust gases to bubble through the ionic liquids could exceed the total energy available from the ship.

A system for scrubbing marine engine exhaust gasses using membrane technology has been proposed in Chinese patent No 200710012371.1.

An object of the present invention is to provide an improved method and system for reducing the concentration of one or more target emission gasses from a source such as a marine diesel engine.

SUMMARY

An alternative to the use of a conventional seawater scrubber for removing unwanted compounds from marine engine exhaust gas is to use membrane technology to separate and process one or more Target Emission Gasses (TEG's) such as SOX, NOX and/or COX from the exhaust gas. Advantages to using membranes over traditional solvent-based extraction processes such as sea water-based scrubbers include being potentially smaller, more energy efficient and producing less waste water than a conventional water-based scrubber. Although membrane-based systems have been proposed in the past, the present invention relates to improvements that render such systems highly effective in a variety of applications including use with marine vessels.

According to one aspect, the invention relates to a method for reducing the concentration of a target emission gas (TEG) from a source of engine exhaust gas comprising the steps of:

directing said gas into an enclosed space containing at least one array of hollow fibre ceramic membranes, wherein said exhaust gas contacts an exterior surface of said membranes whereupon TEG within said exhaust gas selectively permeates through said membrane thereby lowering the concentration of said TEG within said exhaust gas;

circulating a carrier liquid capable of retaining said TEG through bores of said hollow fibre ceramic membranes thereby elevating the concentration of said TEG compounds within said carrier liquid;

discharging said exhaust gas containing a reduced TEG concentration from the enclosed space and discharging said liquid from said hollow fibre ceramic membrane array, wherein said discharged liquid contains molecules of TEG dissolved therein.

The liquid can discharged from the membrane assembly into the environment in one of an "open" mode of operation or alternatively a closed loop mode can be used, such as wherein said TEG is separated from said liquid and said liquid is recycled through said membrane array.

The carrier liquid may comprise one of an ionic liquid, sodium hydroxide, fresh water or seawater. The ionic liquid may comprise a task-specific ionic liquid (TSIL) which is specific to said TEG's. If the carrier liquid is an ionic liquid, the method may comprise the further step performed after said liquid enters the discharge conduit, of separating said TEG from said carrier liquid for storage and recycling said carrier liquid through said membranes.

The TEG may comprise one or more of a sulfur oxide, a nitrous oxide or a carbon oxide such as CO2.

The method may include the further steps of determining the concentration of TEG within untreated exhaust gas, determining an optimal rate of liquid flow required to reduce the TEG concentration in said untreated gas to a target level and selectively controlling the rate of liquid flow through said membrane array to match said optimal rate of liquid flow.

The method may include the further step of determining the effectiveness of said membrane array at reducing concentrations of said TEG by determining whether said liquid passing through said array experiences one or both of a pressure drop that exceeds a predetermined level or a pH drop that is less than a predetermined level.

The membrane array may comprise a module housed in a modular housing wherein said liquid is circulated through a selected number of said modules based on a determination of the level of TEG concentration in said exhaust gas and/or the flow rate of said exhaust gas. Selected ones of said modules may be removed and replaced if it these have been determined to be less effective by a predetermined level.

According to another aspect, the invention relates to an apparatus for lowering the concentration of at least one target emission gas (TEG) from a source of engine exhaust gas comprising:

an enclosure for receiving a stream of engine exhaust
at least one array of hollow fiber ceramic membranes having a bore and configured such that said exhaust contacts the membranes as the exhaust gas is circulated through the array, each of said membranes comprising a semipermeable membrane wall which is permeable to said TEG but non-permeable to non-TEG's in said emission gas and a hollow bore;
a liquid inlet for feeding a carrier liquid into said membrane bores in an unsaturated state;
a liquid outlet for receiving said carrier liquid from said bores after circulation therethrough in a state saturated with said TEG; and
a carrier liquid circulation subsystem to circulate said carrier liquid through said membrane bores and said inlet and outlet manifolds;
wherein said apparatus is configured wherein exhaust gas circulated through said array contacts said membranes at on an exterior surface of the membranes, said liquid contacts said membranes on an opposed surface thereof and said TEG thereby permeates through said membrane from the exterior membrane surface into the bore to transfer said TEG from said exhaust gas into said carrier liquid.

The apparatus may further comprise a carrier recycling subsystem in communication with the primary carrier outlet and inlet, said recycling subsystem comprising a TEG stripping device for removing at least one TEG from said carrier liquid, wherein said carrier is circulated in an essentially closed loop through said apparatus.

The carrier liquid may comprise water which is circulated in an open loop through said apparatus, said apparatus comprising a water inlet and a water outlet for non-recycling circulation of water through said membrane array.

The apparatus may comprise multiple ones of said membrane arrays arranged in parallel or in series for contacting the emission gas, for operation in one of a parallel mode or a sequential mode of circulating the liquid.

According to a still further aspect, the invention relates to a system for lowering the concentration of at least one target emission gas (TEG) from a source of engine exhaust gas comprising:

an enclosure for receiving a stream of engine exhaust;
at least one gas treatment module for installation within said enclosure, said module comprising a housing and an array of hollow fiber membranes supported within the housing and having a bore and configured such that said exhaust contacts the membranes as the exhaust gas is circulated through the array when the module is installed within the enclosure, each of said membranes comprising a semi-permeable membrane wall which is permeable to said TEG but non-permeable to non-TEG's in said emission gas and a hollow bore;
a liquid inlet for feeding a carrier liquid into said membrane bores in an unsaturated state;
a liquid outlet for receiving said carrier liquid from said bores after circulation therethrough in a state saturated with said TEG; and
a carrier liquid circulation subsystem to circulate said carrier liquid through said membrane bores and said inlet and outlet manifolds;
wherein said apparatus is configured wherein exhaust gas circulated through said array contacts said membranes at on an exterior surface of the membranes, said liquid contacts said membranes on an opposed surface thereof and said TEG thereby permeates through said membrane from the exterior membrane surface into the bore to transfer said TEG from said exhaust gas into said carrier liquid.

The system may further include a carrier recycling subsystem in communication with the carrier liquid outlet and inlet, said recycling subsystem comprising a TEG stripping device for removing at least one TEG from said carrier liquid, wherein said carrier is circulated in an essentially closed loop through said apparatus.

Alternatively, the carrier liquid comprises water which is circulated in an open loop through said apparatus, said apparatus comprising a water inlet and a water outlet for non-recycling circulation of water through said membrane array.

The modules may further comprise one or both of a liquid inlet manifold or liquid outlet manifold in fluid communication with said bores at inlet and outlet ends of said bores respectively.

The system may further comprise at least one of a pH sensor system for determining a pH drop in said liquid carrier from circulating through said membrane array and a pressure sensor system for determining a pressure drop in said liquid carrier from circulating through said membrane array, said sensors being operatively linked to a signal processor for determining whether said pH drop and/or pressure drop is indicative of a reduced level of effectiveness of said membrane array at reducing concentrations of TEG.

The system may further comprise a sensor for measuring TEG concentration within untreated exhaust gas from said source and a control system in operative communication with said sensor and with a pump for controlling the flow rate of said carrier liquid through said system, said control system being configured to determine the flow rate of said carrier liquid through modules required in order to achieve a selected level of TEG concentration reduction and to control said flow rate to provide said flow rate.

The invention further relates to a kit comprising the apparatus or system as described herein and at least one carrier liquid for dissolving said TEG. The carrier liquid is one or more of an ionic liquid or sodium hydroxide.
The ionic liquid may comprise one or more of:
1,1,3,3-tetramethylguanidium lactate [TMG][L]
Monoethanolammonium lactate [MEA][L]
i-Butyl-3-methylimidazolium tetrafluoroborate [BMIm][$BF_4$]
i-Butyl-3-methylimidazolium methylsulfate [BMIm][$MeSO_4$]
i-Hexyl-3-methylimidazolium methylsulfate [HMIm][$MeSO_4$]
i-Ethyl-3-methylimidazolium methylsulfate [EMIm][$MeSO_4$]
i-Butyl-3-methylimidazolium hexafluorophosphate [BMIm][$PF_6$].

An ionic liquid, used in association with an appropriate semipermeable membrane, can separate, capture and store a Target Emission Gas (TEG) such as SOX, NOX and/or COX from the exhaust gas in a closed loop reversible process. This alternative can eliminate or reduce the production of waste water and waste sludge in comparison with certain other solvents.

An ionic liquid (IL) is a solution that contains an organic cation (e.g. imidazolium, pyridinium, pyrrolidinium, phosphonium, ammonium), and a polyatomic inorganic anion (e.g. tetrafluoroborate, hexafluorophosphate, chloride) or an organic anion (e.g. trifluoromethylsulfonate, bis[(trifluoromethyl)sulfonyl]imide. The main advantages of ILs are their negligible volatility, non-flammability and good chemical and thermal stability. They are considered as environmental benign carriers as compared to volatile organic solvents, reducing the environmental risks of air pollution. Furthermore, certain properties of ILs (hydrophobicity, viscosity, solubility, acidity and basicity etc.) can be tuned to improve the solubility of one or more TEGs within the IL by selecting a specific combination of cation and anion and varied by altering the substitute group on the cation or the combined anion.

An ionic liquid may be "task specific." An example of such a Task Specific Ionic Liquid (TSIL) is formed by the reaction of 1-butyl imidazole with 3-bromopropylamine hydrobromide, following a workup and anion exchange. This yields an ionic liquid active at room temperature, incorporating a cation with an appended amine group. The ionic liquid reacts reversibly with $CO_2$, reversibly sequestering the gas as a carbamate salt. The ionic liquid, which can be repeatedly recycled, is comparable in efficiency for $CO_2$ capture to commercial amine sequestering reagents and yet is nonvolatile and does not require water to function. The unique properties of ionic liquids make them particularly well-suited for physical and chemical absorption processes. They can be easily adjusted by substituting cations and anions in their structure and thereby "tuned" to absorb specific gases by either physical and or chemical absorption over specified processing conditions including temperature and pressure. These task specific ionic liquids provide significant improvements in chemical absorption efficiencies over other solvents Ionic liquids have application in various liquid chemical separation processes. An example of an IL application is the BASIL (Biphasic Acid Scavenging utilizing Ionic Liquids) process developed by BASF, in which 1-alkylimidazole scavenges an acid from an existing process. IL compounds are also used in chemical synthesis such as the synthesis process for 2,5-dihydrofuran by Eastman and the difasol process, an IL-based process which is a modification to the dimersol process by which short chain alkenes are branched into alkenes of higher molecular weight. A further IL-based process is the Ionikylation process developed by Petrochina for the alkylation of four-carbon olefins with isobutane.

The invention is based on the principle that SOX, NOX, and/or COX can be selectively removed from marine exhaust gases by the use of a liquid carrier circulated through a semi-permeable membrane system such as a ceramic membrane. These impurities are generally considered safe for discharge when dissolved into a liquid but should not be discharged as gasses into the atmosphere. With the use of a membrane to separate such compounds, the TEG can permeate through the membranes while particulates within the marine exhaust including ash, soot, and oils do not. The carriers remain clean and devoid of toxic impurities, and can be safely discharged, re-used, or regenerated.

The system according to the invention can be operated in an operating modes consisting of one of an Open Mode, a Closed Loop or a Zero Discharge mode.

The liquid carrier used in an Open Mode can be the water within which the vessel floats, which can be fresh water or sea water. The membrane separation system comprises an array of porous hollow fiber membrane membranes in which fresh water or sea water circulates within the interiors of the membranes. The fresh water or sea water is drawn into the vessel from surrounding waters and is circulated through the hollow fiber membrane membranes. Flue gases pass over and contact the exterior of the porous hollow fiber membrane membranes and permeate through the membrane. One or more TEG's is absorbed by the water and removed from the exhaust stream. The absorbed gases form acids, which are neutralized by the hardness of the fresh water or salinity of the sea water as precipitates such as sulfides. The fresh water or sea water containing the precipitates is subsequently discharged into the surrounding waters of the ship.

The carrier liquid used in a Closed Loop mode can be a basic solution such as sodium hydroxide, which is circulated through a hollow fiber membrane array. Flue gases contact the porous hollow fiber membrane and permeate through the membrane into the bore within which the carrier circulates. TEG's are absorbed by the solution within the membrane bore and thus removed from the exhaust stream. The absorbed gases form acids which are neutralized by the base. The heat absorbed by the carrier liquid as it passes through the membrane array elevates the carrier temperature and maintains the TEG compounds in solution. The carrier liquid can then be cooled within a desorption vessel, which causes the TEG compounds to precipitate in solid form such as sulfide precipitates. The precipitated solids can then be removed by a mechanical separation process such as filtering. The unsaturated carrier liquid can then be recirculated as a closed circulation loop. Cooling of the carrier liquid within the desorption vessel can be provided by use of a heat exchanged within the vessel in which ocean water is circulated as a cooling fluid.

The liquid carrier used in a Zero Discharge mode is an ionic liquid (IL). The zero discharge mode comprises a closed loop reversible process where little or no chemical precipitates are generated. The membrane separation system comprises an array of porous hollow fiber membrane membranes through which IL circulates and a desorption vessel (DV) for separating the TEG's from saturated IL. The sulfur dioxide, nitrogen oxides and carbon oxides can be separated from the ionic liquids within the DV by the application of one or more of differential pressure, temperature, and/or electric potential. The separated gases are then stored in pure states or as compounds, and the ionic liquid reused. The absorbed gases are stored and be used for commercial applications. The differential temperature required to dissociate the gases is provided by the exhaust gases by means of a heat exchanger.

By means of the invention, exhaust gases permeate through the ceramic porous membranes but toxic particulates within the marine exhaust including ash, soot, and oils are too large to permeate through the membrane pores. The carriers remain clean and void of toxic impurities and can be safely discharged, re-used or regenerated in open loop, closed loop, or zero discharge modes. In contrast, conventional Wet Water Scrubbers may spray carriers directly into the marine exhaust. Toxic particulates become trapped and suspended within the carriers, and must be removed from the carriers using complex, energy intensive, and expensive cleaning systems. The cleaning process produces a sludge byproduct that is expensive to dispose of on land.

Definitions

In the present patent specification, the following terms shall have the meanings described below, unless otherwise specified or if the context clearly requires otherwise:

"Gas" or "gasses" refer to a compound or mixture of compounds that exists in the gas phase under ambient conditions of temperature and pressure.

"Diesel" refers to an internal combustion engine that of the compression-ignition design. A diesel engine can burn a variety of fuels including without limitation diesel fuel, bunker crude, biodiesel and others. The term "diesel" or "diesel emissions" is not restricted to any particular fuel type but includes any hydrocarbon fuel that may be combusted in a diesel-type engine.

"Target Emission Gas" or "TEG" refers to any gas or gasses that are intended to be removed from an exhaust gas stream generated by a combustive process. TEG's can include but not limited to Sulfur Oxides, Nitrogen Oxides, and Carbon Oxides such as C02. It will be understood that a TEG can exist in either a gas phase or a liquid or solid phase under different conditions such as when dissolved into solution or bound to a liquid phase compound.

"Emissions" refers to total combustion exhaust gasses from an engine or other source of exhaust gasses, including target emission gas as well as other gasses.

"Carrier" refers to either one of a liquid containing a compound that is capable of binding to a TEG or a liquid that can dissolve a TEG into solution so as to be operative in a membrane system to selectively reduce the concentration of the TEG from a gas-rich environment.

"Semi-permeable membrane" may also be termed a selectively permeable membrane, a partially permeable membrane or a differentially permeable membrane, and is a membrane that allows selected molecules or ions to pass through it by diffusion. The rate of passage through the membrane can depends on the pressure, concentration, and temperature of the molecules or solutes on either side, as well as the permeability of the membrane to each solute. The membrane can vary in thickness, depending on the composition of the membrane and other factors.

BRIEF DESCRIPTION OF THE DRAWINGS

In order to better understand various exemplary embodiments, reference is made to the accompanying drawings, wherein.

DETAILED DESCRIPTION

Figure 1:
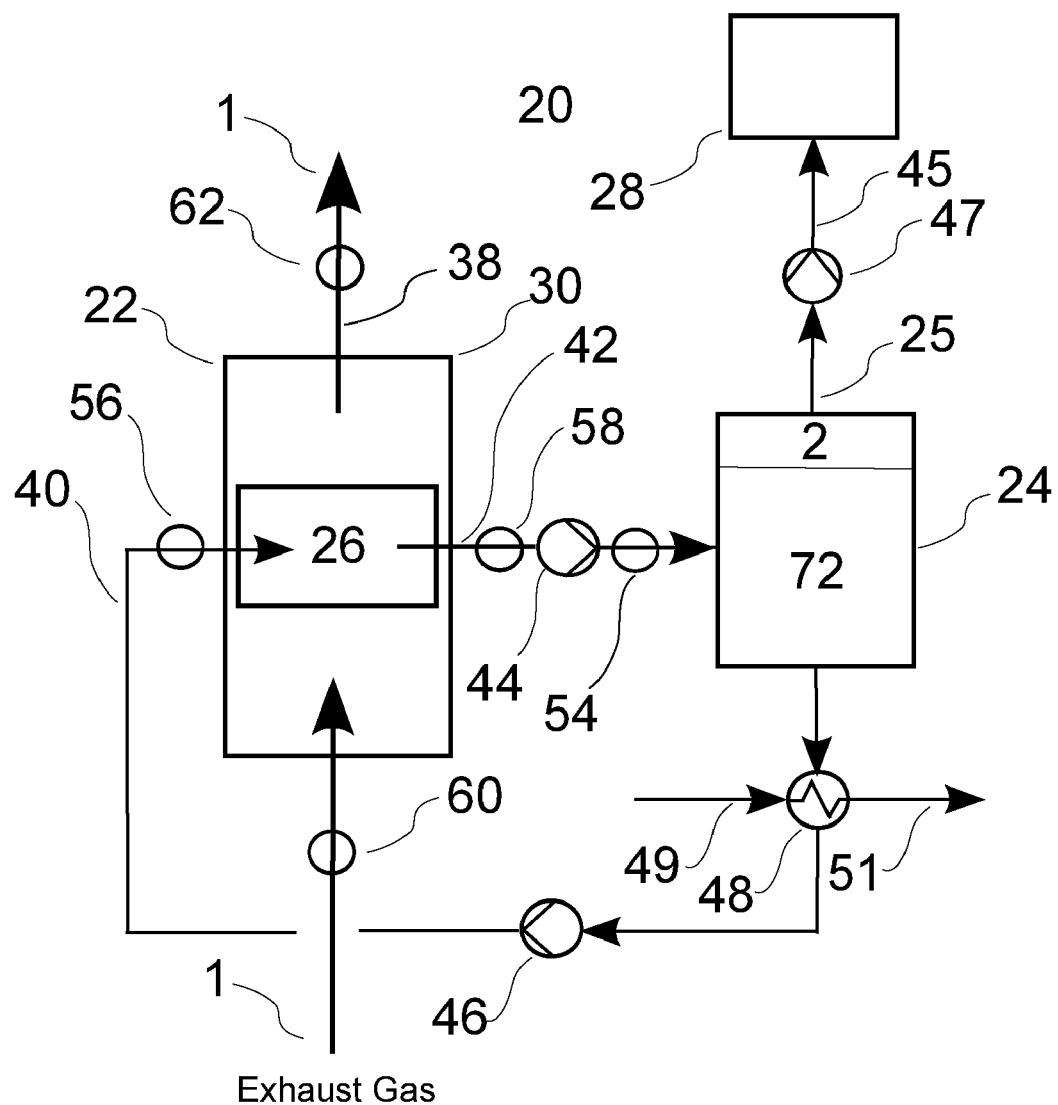
FIG. 1 is a schematic drawing showing an emissions reduction system according to one embodiment of the invention.
Figure 2:
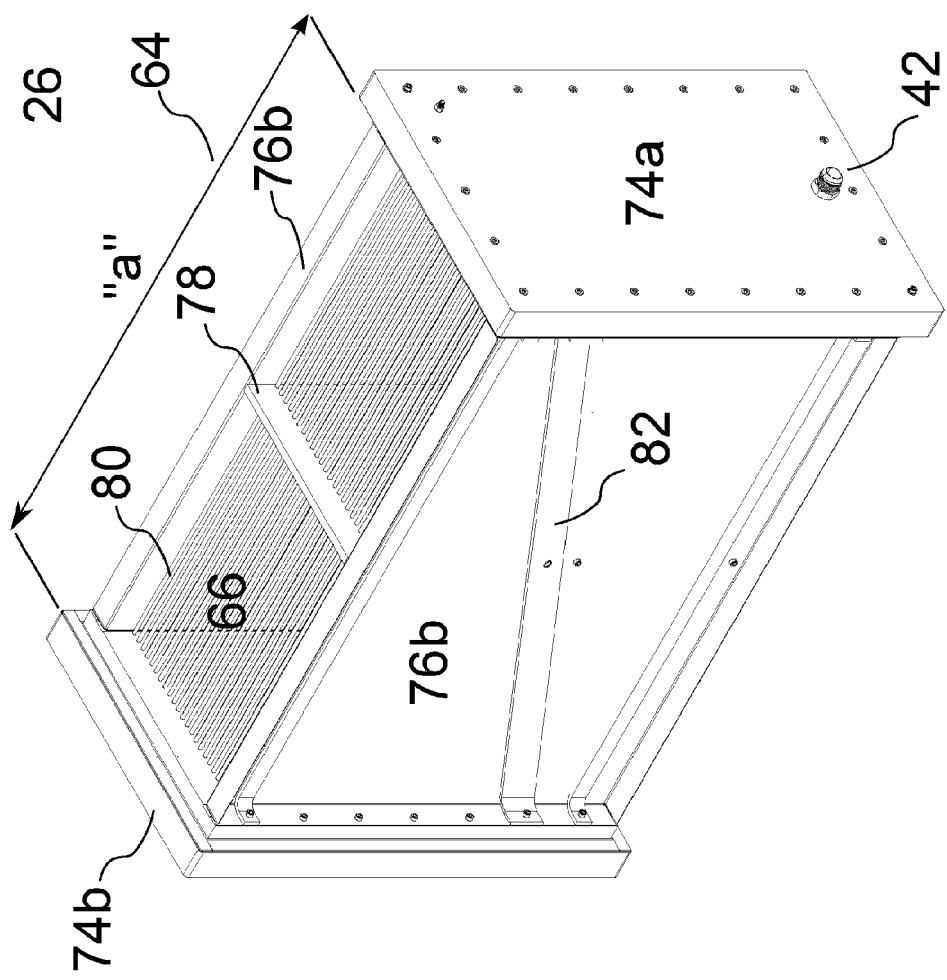
FIG. 2 is a perspective view of a gas absorption module according to the present invention.
Figure 3:
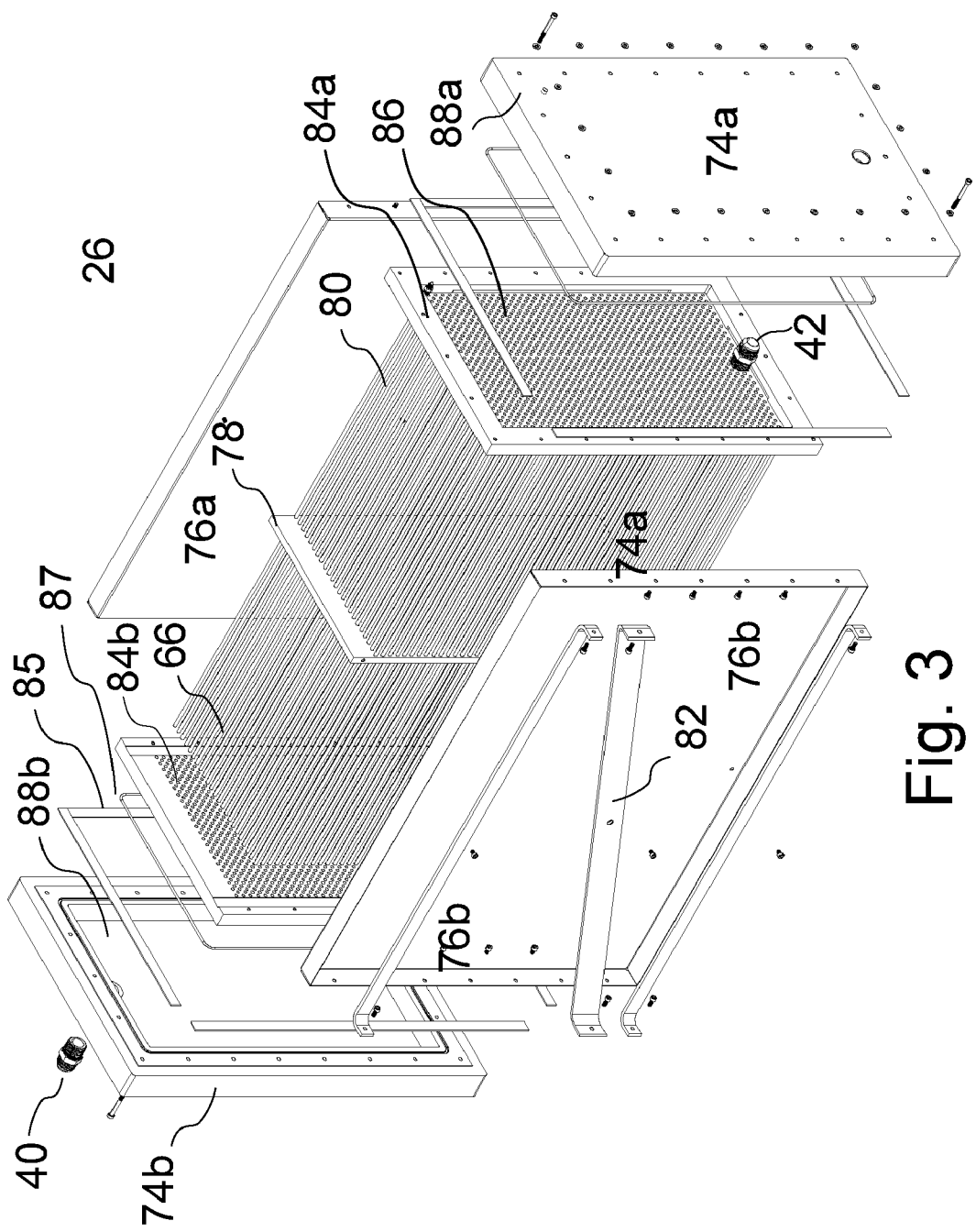
FIG. 3 is a perspective view, exploded, of the gas absorption module of FIG. 2.

FIG. 1 is a schematic diagram of an embodiment of an exhaust gas treatment system 20 according to the invention, which is useful for reducing the concentration of one or more target emission gasses (TEG's) 2 from an exhaust gas stream 1. Gas stream 1 comprises a mixture of TEG molecules 2 and non-TEG molecules 3. The exhaust gas 1 may be generated by a marine diesel engine or other combustion process. For example, the system may be adapted to process exhaust from a heater, a burner or a gas turbine as well as various types of internal combustion engines. The gas treatment system 20 shown in FIG. 1 is a "closed loop" system that comprises in general terms a gas absorption unit 22, a TEG desorption unit 24 for separating the sequestered TEG compounds from the carrier liquid, and associated conduits, valves, pumps and other components for circulating exhaust gas, carrier and separated TEG, as described below. In the embodiment of FIG. 1, gas treatment system 20 further comprises a gas storage module 28 which stores the isolated TEG in the form of compressed gas or other suitable storage form. As discussed below, at least some TEG's may be disposed of without storage, for example by discharging into the ocean in an aqueous solution.

Figure 4:
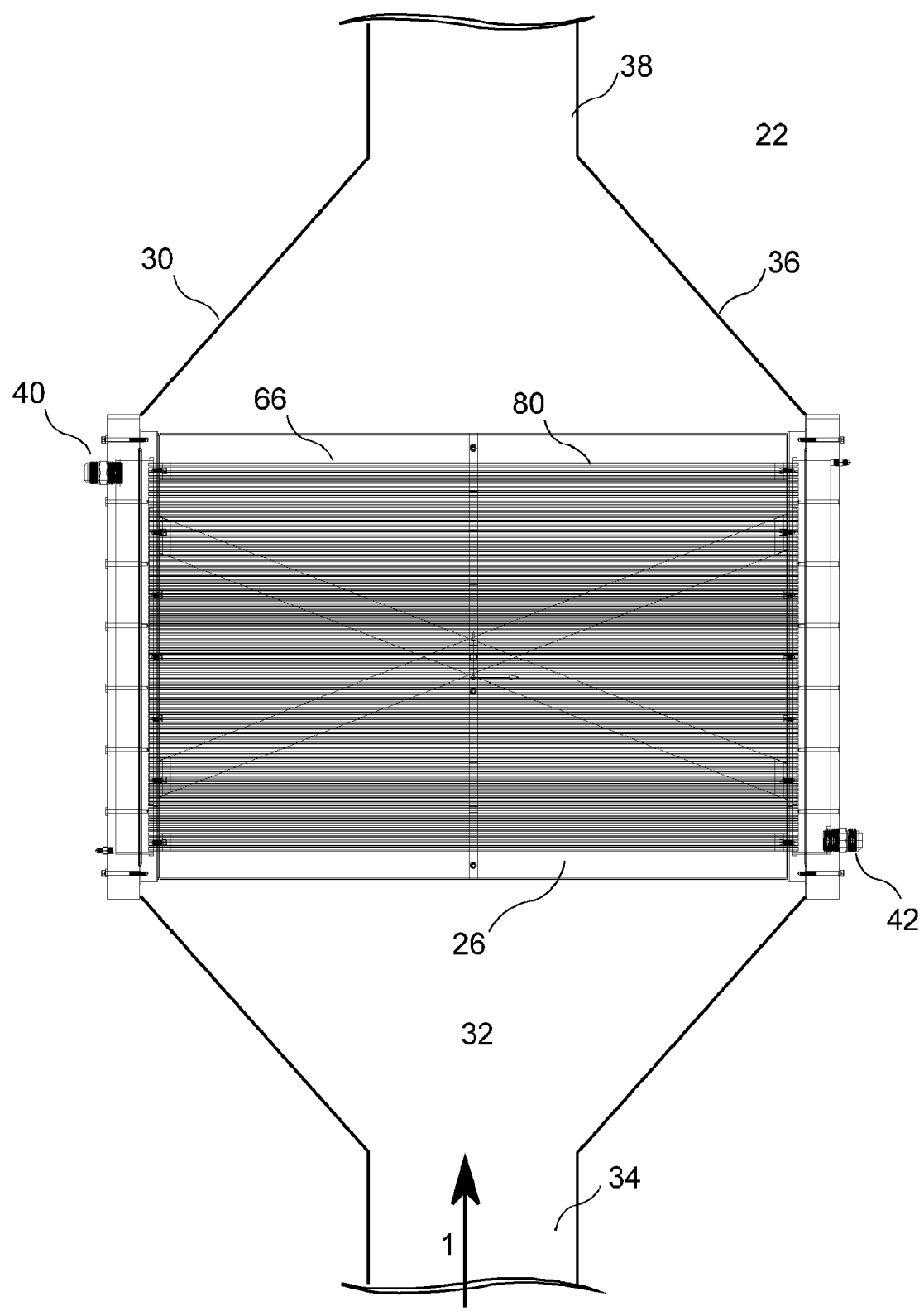
FIG. 4 is a cross-sectional view of a gas absorption module and associated housing and gas duct components.

Gas absorption unit 22 comprises a main housing 30, seen in detail in FIG. 4, which houses one or more absorption modules 26. Exhaust gas is circulated through main housing 30 from gas inlet plenum 32, which receives gas from engine conduit 34. The exhaust gas is circulated through one or more absorption modules 26 that are mounted within main housing 30, following which the treated exhaust gas is exhausted through outlet plenum 36 into gas outlet conduit 38 for discharge into the environment.

Multiple modules 26 can be configured within main housing 30 in an array for operation in parallel or in series for removing a selected TEG's from the engine exhaust. Operation of system 20 in parallel refers to a mode of operation wherein carrier is fed to multiple modules 26 in parallel, such that each module receives equally unsaturated carrier liquid. Operation of system 20 in series refers to a mode of operation wherein the carrier liquid is fed in series through multiple modules 26 whereby the liquid becomes increasingly saturated as it passes through the respective modules. FIG. 1 depicts a system containing a single module 26; FIGS. 7-12 depict alternative treatment systems in which absorption system 20 comprises multiple absorption modules 26. Each absorption module 26 contains therein a membrane assembly 66.

Exhaust gas enters gas absorption unit 22 through an inlet conduit 34 and is discharged after treatment through outlet conduit 38. Unsaturated liquid carrier is fed into gas absorption unit 22 through liquid inlet conduit 40. The saturated liquid carrier exits unit 22 through outlet conduit 42 and is then fed into desorption unit 24 where the TEG is removed from the carrier. As discussed below, the carrier liquid absorbs one or more TEG's from the exhaust gas for transport to a separate location for storage or disposal. The now-unsaturated carrier is then recirculated into inlet conduit 40. As seen in FIG. 1, liquid flow is pressurized by a first pump 44 within outlet conduit 42 and a second pump 172 within the inlet conduit 40. Gas outflow from desorption unit 24 is pressurized by pump or compressor 46. A heat exchanger 48 is in-line with liquid conduit 40 to remove excess heat from the recycled carrier. A coolant fluid (gas or liquid) enters heat exchanger 48 through inlet conduit 49 and exits through outlet conduit 51, for optional on-board use on the vessel.

As shown generally in FIG. 1, saturated carrier liquid from separation absorption unit 22 enters desorption tank 24 wherein the saturated carrier is subjected to conditions of relatively reduced pressure and or increased temperature. Under these conditions, the dissolved and/or bound TEG degasses and bubbles out. Dissolved mineral salts precipitate out of solution and settle to the bottom of the tank. The separated gas accumulates at the top of tank 24, from where it is released through gas outlet 25. The released gas from tank 24 flows through pipe 45 and is pressurized therein by gas pump 47, which pumps the TEG into one or more pressurized gas storage vessels 28 for safe disposal, either on-board to on shore. The now-unsaturated carrier is then piped back into absorption unit 22 through inlet conduit 40.

Gas treatment system 20 further comprises a pH sensor 54 for measuring the pH of carrier liquid within outlet conduit 42. System 20 further comprises a first pressure sensor 56 for measuring the carrier liquid pressure within inlet conduit 40 and a second pressure sensor 58 for measuring carrier pressure within outlet conduit 42. One or more first TEG sensors 60 are provided for detecting the level(s) of selected TEG's within the untreated exhaust entering system 20 within engine exhaust conduit 34. One or more second TEG sensors 62 are provided for detecting the levels of the selected TEG's within the treated exhaust in discharge conduit 38. The respective sensors 60 and 62 are in operative communication with a control system 200 whereby the values detected thereby are transmitted in realtime to control system 200 for efficient operation of the system, as described in more detail below.

As seen in more detail in FIGS. 2-5, gas absorption module 26 comprises a housing 64 for housing a membrane assembly 66. Untreated exhaust gas 1 enters housing 64 for contact with assembly 66, following which the scrubbed gas 3 exits housing 64. The scrubbed exhaust gas is at least partially depleted of one or more TEG's 3. Within housing 64, TEG's 3 are stripped from the exhaust gas 1 by contact with a hollow fiber semi-permeable membrane using a carrier-based gas absorption process. Fresh (unsaturated) relatively cool carrier enters housing 64 through carrier inlet conduit 40 and saturated, TEG-laden carrier liquid 72 exits through outlet conduit 42.

Module housing 64 can be modular in configuration to permit convenient assembly of multiple modules 26 in the form of a single unit for installation in a vessel or elsewhere. As discussed below, multiple modules 26 can be linked in parallel or series depending on the application. In one example, housing 64 is rectangular and has dimensions of 50 cm×50 cm×100 cm. Housing 64 may be fabricated from metal sheeting such as a heavy gauge stainless steel sheet. Multiple modules 26 can be secured in a rack for access and easy replacement.

Housing 64 is fabricated from sheet metal and comprises opposing side walls 74a and 74b and opposing end walls 76a and 76b. For purposes of description, an elongate axis "a" can be considered to extend between end walls 76a and b. The interior of housing 64 is divided into two essentially equal spaces by a central divider wall 78 which is parallel to end walls 76. Divider wall 78 supports hollow membrane membranes 80 within housing 64, as described below. External bracing members 82 may be provided for additional structural integrity of housing 64. Housing 64 is open above and below to allow gas to flow freely through the housing.

Housing 64 retains within its interior first and second perforated walls 84a and 84b (seen in FIG. 3), each having an array of perforations 86. Perforated walls 84a and b are secured to corresponding end walls 76a and b, and are of essentially identical configuration thereto to substantially cover the respective end walls 76.

End walls 76a and 76b have recessed central portions 88a and 88b respectively that open to the interior of housing 64. Recesses 88a and b are covered by respective perforated walls 84a and b, which are sealed and secured to end walls 76 by mounting strips 85 and gaskets 87. Recesses 88a and b each define an enclosed manifold, recess 88b defines an inlet manifold and recess 88a defines an outlet manifold.

Perforated walls 84 may be secured to end walls 76 by bolts or other fasteners.

Housing 64 houses within its interior one or more membrane assemblies 66. Each assembly 66 consists of an array of porous ceramic hollow fiber membranes 80 that span the interior of housing 64, extending axially between end walls 76a and b. Membranes 80, one of which is shown in detail in FIG. 6, each comprise a tubular ceramic membrane wall 90 and a hollow central bore 92. In operation, shown schematically in FIG. 5, liquid carrier flows through bore 92 while exhaust gas contacts the exterior of membrane wall 90. Membranes 80 are semi-permeable in that the membrane wall has pores that permit TEG's to permeate the wall into the bore, while other exhaust gasses are blocked. The liquid carrier circulating within bore 92 is unable to penetrate membrane wall 90. The flow of unsaturated carrier through bore 92 maintains a lower gas partial pressure of TEG's within the carrier, thereby generating a flow of TEG across membrane wall 90 from the gas side, where the partial pressure is relatively high, to the carrier side where the partial pressure is low. As a result, membranes 80 are able to separate TEG's from an exhaust gas stream channeled through housing 64.

Suitable ceramic hollow fiber membranes include commercially available aluminum oxide (Al2O3) hollow fibre membranes, such as the Membralox® membrane. A description of this membrane is available at: http://www.pall.com/main/food-and-beverage/product.page?id=41052. Representative dimensions of a suitable membrane 80 is: pore size: 100 A; ID: 4 mm; length: 1020 mm.

Opposing ends of membranes 80 are secured within openings 86 in walls 84a and b. Membrane bore 92 communicates with a respective opening 86 at either end of membrane 80. The intersection between membrane 140 and each corresponding opening 86 is sealed against fluid (gas and or liquid) leakage. For example, membranes 80 may be secured to walls 84 at openings 86 by a soldering or gluing process. Membranes 80 pass through openings 94 within divider wall 78, which supports membranes 80 at their midpoint. It will thus be seen that fluid entering into inlet manifold 88b is distributed across membrane array 96 wherein the fluid enters into bores 92 of membranes 80. The carrier then flows through bores 92 and is discharged into outlet manifold 88a. All liquid-filled spaces within housing 64 are sealed against leakage.

Unsaturated carrier liquid enters inlet manifold 88b through liquid inlet 98 (seen in FIG. 3) from where it is distributed into membranes 80. After passing through membrane array 96, the now-saturated carrier enters outlet manifold 88a from where it is discharged through outlet too. Inlet 98 and outlet 100 are connected to hoses or other liquid conduits, shown schematically in FIGS. 1-3, leading to other components of system 3.

Untreated exhaust gas enters housing 64 through inlet plenum 32, which discharges untreated (raw) exhaust gas from an engine or other source of contaminated gasses that contains a TEG. The gas flows through the interior of housing 64, contacting membrane array 96 as the gas travels to outlet plenum 36. Membrane array 96 essentially fills the interior of housing 64 whereby a large portion of the gas contacts at least one membrane wall 90 as the gas flows through the housing. The amount of contact between exhaust gas and the membrane surfaces will be determined by several factors including the configuration of array 96, the size and spacing of membranes 80 and the speed of gas flow through housing 64. Increased contact may be obtained by closer spacing of membranes and a larger number thereof, although this has to be balanced against a possible increase of backpressure and other factors. As a result, the configuration of membrane array 96 including the number of tubular membranes that can be included within a housing of a given size, will depend to some extent on the parameters of the engine that provides the expected source of emissions and such factors as the backpressure that can be imposed by device 3 without causing significant decrease in engine performance.

Figure 5:
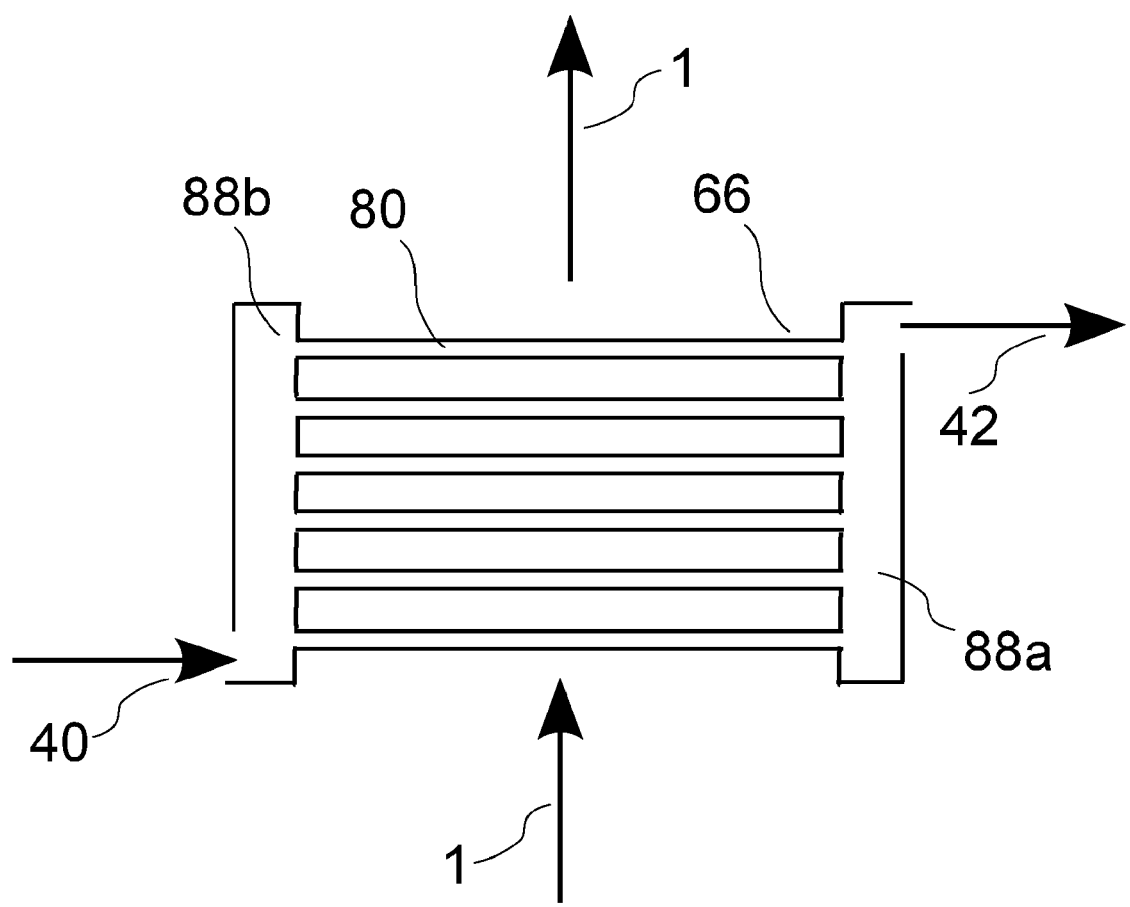
FIG. 5 is a schematic view of internal components of the gas absorption module.
Figure 6:
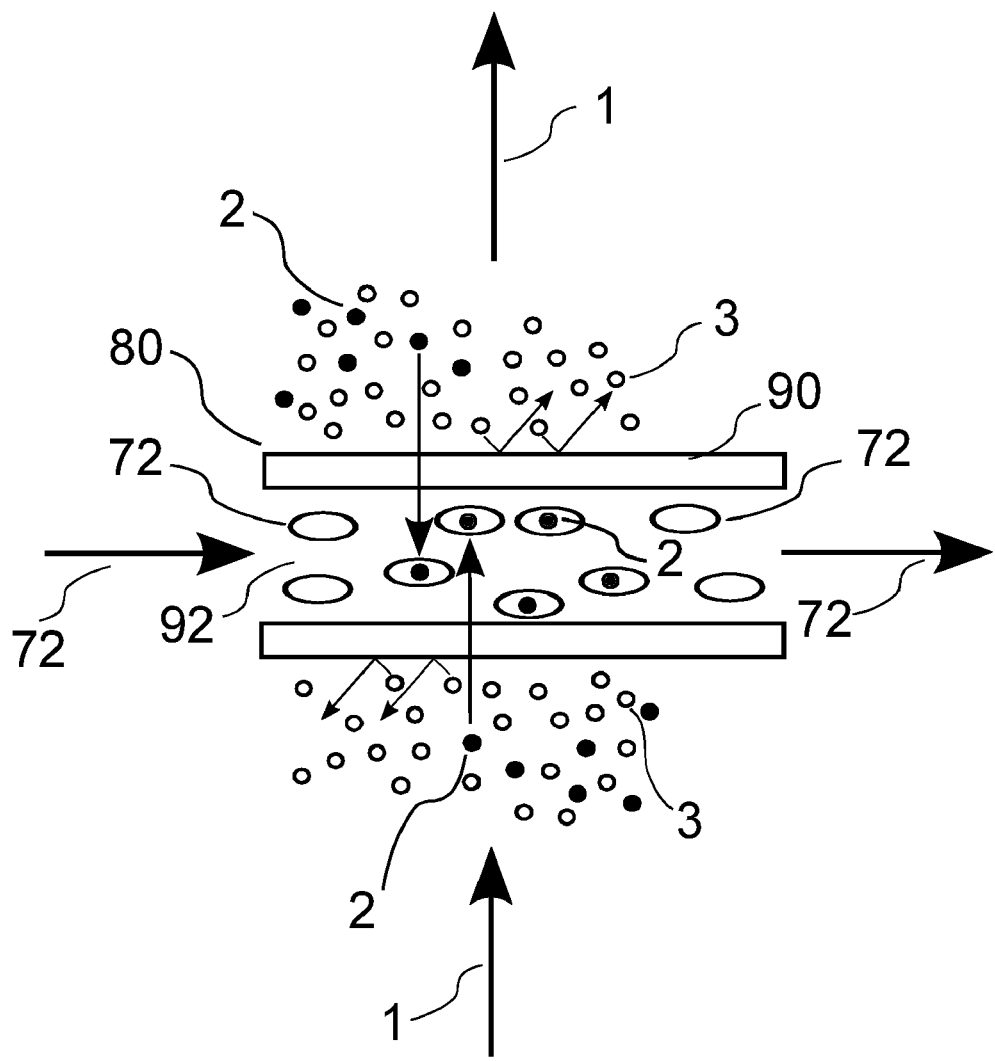
FIG. 6 is a schematic view of a hollow fiber ceramic membrane within a gas absorption module, schematically showing selective absorption of TEG's.

The respective gas and carrier flowpaths through the housing 64, wherein the gas and liquid streams contact opposing surfaces of membranes 80, are shown schematically in FIGS. 5 and 6. As shown, liquid 72 flows through the bore 92 or membrane 80 while the emission gas 1 contacts the exterior of membrane 80. As the raw emission gasses 1 contact the surface of membrane 80, the TEG molecules 68 within gas 1 permeate through membrane 80 from a region of high gas concentration (high gas partial pressure) to a region of low gas concentration (low gas partial pressure). Non-TEG molecules 147 are excluded from membrane 80 and thus concentrate within housing 64 exteriorly of membranes 80, to form a concentrated emissions gas that is rich in non-TEG components and containing a reduced amount of TEG.

The exterior of membranes 80 thus consists of a high partial pressure side of membrane wall 90, in which the partial pressure of TEG's within the exhaust gas is relatively high in comparison with the partial pressure of the carrier circulating within bore 92. The difference in partial pressure drives the TEG's from the exterior to the interior of membrane 80. Carrier 72 flows through the interiors of membranes 80 to maintain a consistently low gas partial pressure of the TEG's.

TEG molecules 68 diffuse through the membrane according to Fick's law of diffusion and exit the membrane material at the low pressure side, where they dissolve into the permeate liquid 72 or otherwise combine with liquid 72. The stripped exhaust gas, which is rich in non-TEG molecules 3 and low in TEG molecules 68, then exits housing 64 for discharge into the atmosphere.

Carrier liquid 72, carrying TEG's 68 in dissolved or bound form (depending on the carrier), then exits housing 64 and is circulated to gas desorption vessel 24. Desorption vessel 24 is depicted schematically in FIG. 19 Vessel 24 comprises a tank for retaining the IL therein, and comprises an inlet 102 for gas-bearing IL, a liquid outlet 104 for the recycled (non-gas bearing) IL and a gas outlet 25 for discharge of gas separated from the ionic liquid, into gas conduit 108. The tank may comprise a tank wall of stainless steel or low carbon steel. The pressure within the tank is reduced relative to the fluid pressure within the conduits. Tank 24 is also maintained at an elevated temperature via a heat exchanger. Heating fluid enters inlet 360 and exits outlet 361. Ionic liquid enters tank 24 through inlet 102 and is allowed to degas within the tank. Within desorption vessel 24, TEG's (such as SOX, NOX, or COX) that have dissolved into the ionic liquid degas and are released from solution as bubbles under conditions of reduced pressure and/or elevated temperature relative to these conditions within absorption module 26. Optionally, an electric charge can be applied within vessel 24 to improve the efficiency of the gas separation step. The released gasses accumulate in tank 24 at an upper region above liquid inlet 102. The separated gases are released from gas outlet 25. The discharged gasses are then pressurized by compressor 46 for storage within gas storage tank 28. The compressed gasses may then be safely disposed of on land. The IL is cooled via heat exchanger prior to discharge from outlet 104 and re-use. Coolant fluid enters inlet 362 and exits outlet 363. Precipitation of salts and insoluble compounds within Tank 24 settle in the bottom and can be periodically purged via valve 365.

Carrier liquid 72 may comprise a task specific ionic liquid (TSIL) which binds with the TEGs molecules and increases diffusion efficiency through the phenomenon commonly referred to as the facilitated transport.

Examples of TSILs that may be used in the present invention, either alone or in combination, include:

1,1,3,3-tetramethylguanidium lactate [TMG][L]
Monoethanolammonium lactate [MELA] [L]
i-Butyl-3-methylimidazolium tetrafluoroborate [BMIm][BF$_4$]
i-Butyl-3-methylimidazolium methylsulfate [BMIm][MeS0$_4$]
i-Hexyl-3-methylimidazolium methylsulfate [HMIm][MeS0$_4$]
i-Ethyl-3-methylimidazolium methylsulfate [EMIm][MeS0$_4$]
i-Butyl-3-methylimidazolium hexafluorophosphate [BMIm] [PF6]
i-Butyl-3-methylimidazolium trifluoromethanesulfonate [BMIM]OTf.
i-butyl-3-methyl-imidazolium hexafluorophosphate ([C4mim] [PF$_6$])

Alternatively, carrier 150 may comprise sodium hydroxide, which can be used to absorb sulfur oxides from the emission stream and neutralize sulfur acids.

FIGS. 7-12 depict alternative embodiments of gas treatment system 20.

Figure 7:
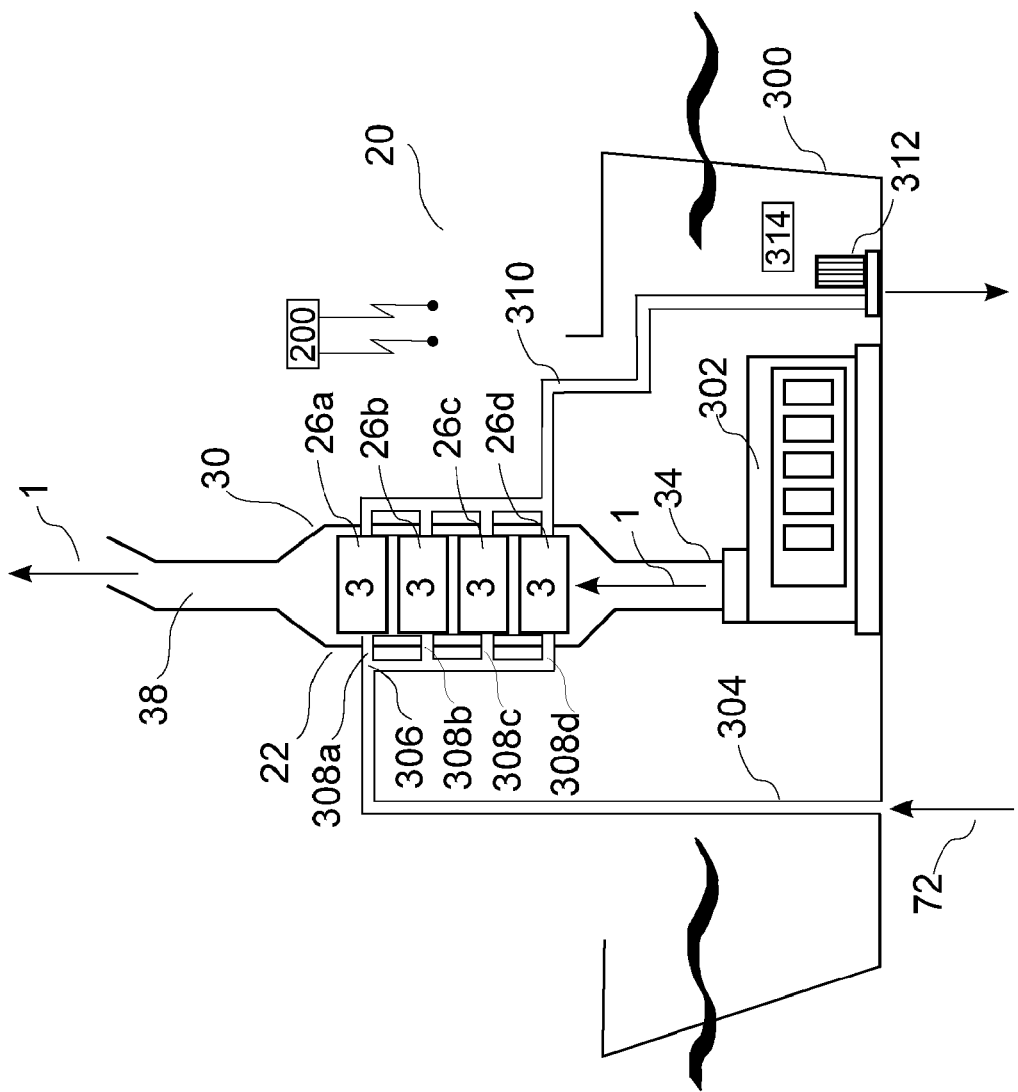
FIG. 7 is a schematic view a gas treatment system according to one embodiment of the invention.

One embodiment of system 20, seen in FIG. 7, is an "open" system installed in a marine vessel 300. In this embodiment, carrier liquid 72 comprises water such as sea water or fresh water pumped from the surrounding water environment of the vessel and then discharged back into the water after one or more TEG compounds have dissolved into the water. Water (in particular seawater) can absorb sulfur oxides from the emission stream and neutralize sulfur acids. Gasses generated by marine diesel engine 302 are discharged into exhaust conduit 34. Conduit 34 opens to an absorption unit 22 via inlet manifold 32. Within desorption unit 22 are installed multiple (in this case four) gas absorption modules 26a-d, which are linearly arranged in series within housing 30. Exhaust gas passes through housing 30, contacting respective membrane assemblies 66 within modules 26a-d and is discharged to the atmosphere through discharge conduit 38.

In the embodiment of FIG. 7, seawater (or freshwater, if the vessel is traveling in a freshwater environment) is drawn from the surrounding water through inlet pipe 304, which opens at one end to the exterior of vessel 300. Pipe 304 enters a pipe splitter 306 wherein the water flow is diverted through 4 individual pipes 308 a-d, which in turn each feed into a corresponding inlet manifolds of respective absorption modules 26a, 26b, 26c and 26d. Modules 26a-d operate in parallel with respect to carrier circulation wherein the carrier is fed through the respective modules in parallel. The sea or fresh water circulates through the respective modules where it becomes saturated with TEG's dissolved therein from the exhaust passing through the respective modules. The saturated water is then collected into a common discharge conduit 310 and is discharged back into the ocean. Water is pumped through the system by a pump 312 at the outlet end of the water circulation system. Pump 312 is controlled by pump controller 314, as discussed below.

The multiple modules can be the same or different. In the case of different modules, the membrane assemblies therein can be configured with different pore sizes and/or membrane wall thicknesses to absorb different TEG's.

Furthermore, although FIG. 7 depicts four modules 26a-d, any number of modules may be provided depending on the flow rate of exhaust gas, desired TEG reduction level and other parameters.

Figure 8:
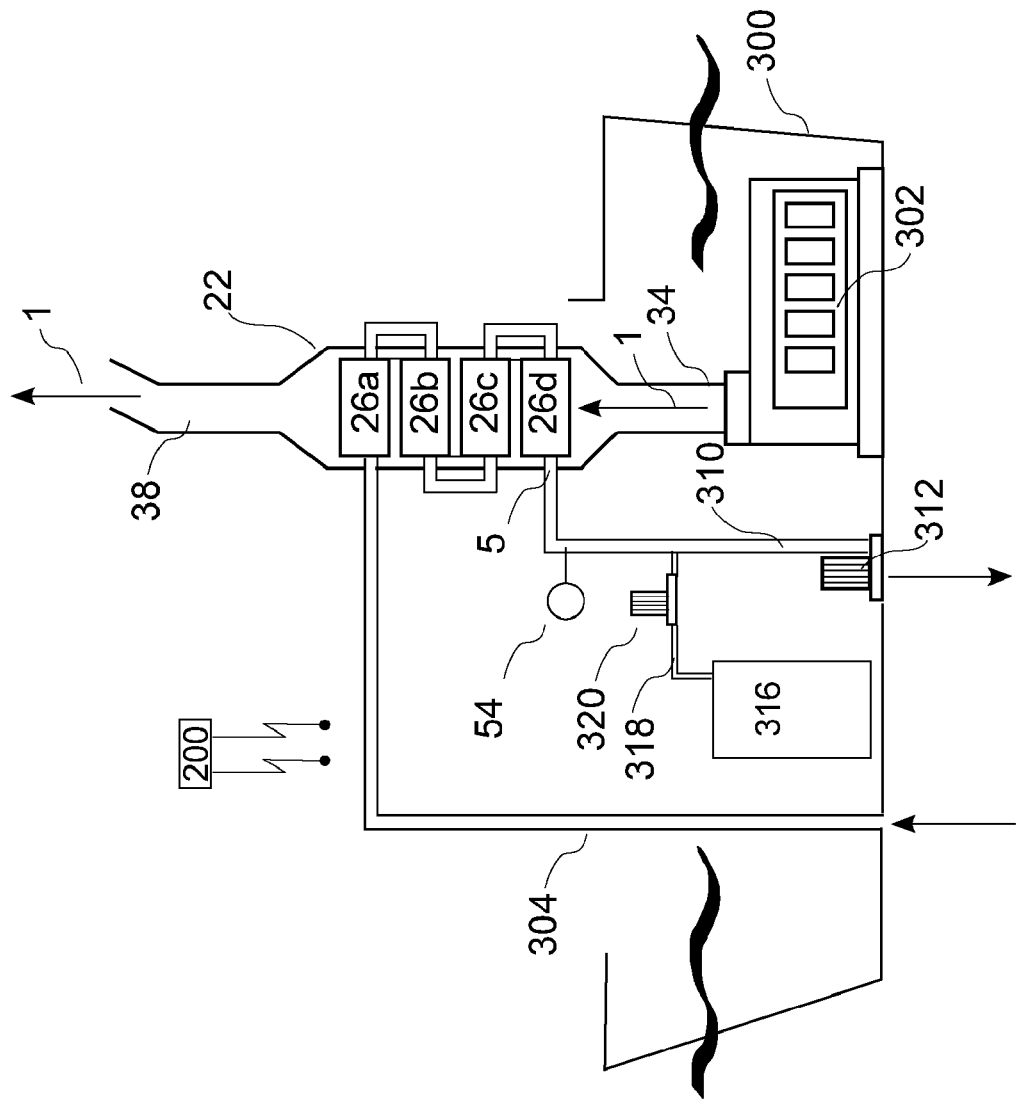
FIG. 8 is a schematic view a gas treatment system according to a second embodiment of the invention.

An embodiment depicted in FIG. 8 is an "open" system similar to FIG. 7. However, rather than a parallel delivery of carrier to modules 26a-d, in the example of FIG. 8, carrier (sea/freshwater) is delivered to modules 26a-d in series, i.e. sequentially. Thus, water inlet conduit 304 initially delivers water to module 26a, from where it is discharged into module 26b and so forth until finally discharged from module 26d, back into the surrounding seawater. FIG. 8 depicts an optional component that dispenses a neutralizing compound such as MgOH which can be selectively introduced into the saturated seawater prior to discharge into the ocean to reduce the acidity of the discharged water in order to comply with any applicable regulatory restrictions against discharge of acid solutions. A basic solution is stored in a tank 316 and discharged through a pipe 318 into water conduit 310. The basic solution is pumped by a pump 320 which is controlled by controller 200 responsive to the pH level with the saturated water, as detected by pH sensor 54. The basic solution is combined with the saturated carrier liquid at a rate selected to reduce the acidity therein by a selected level, for example for regulatory compliance.

Figure 9:
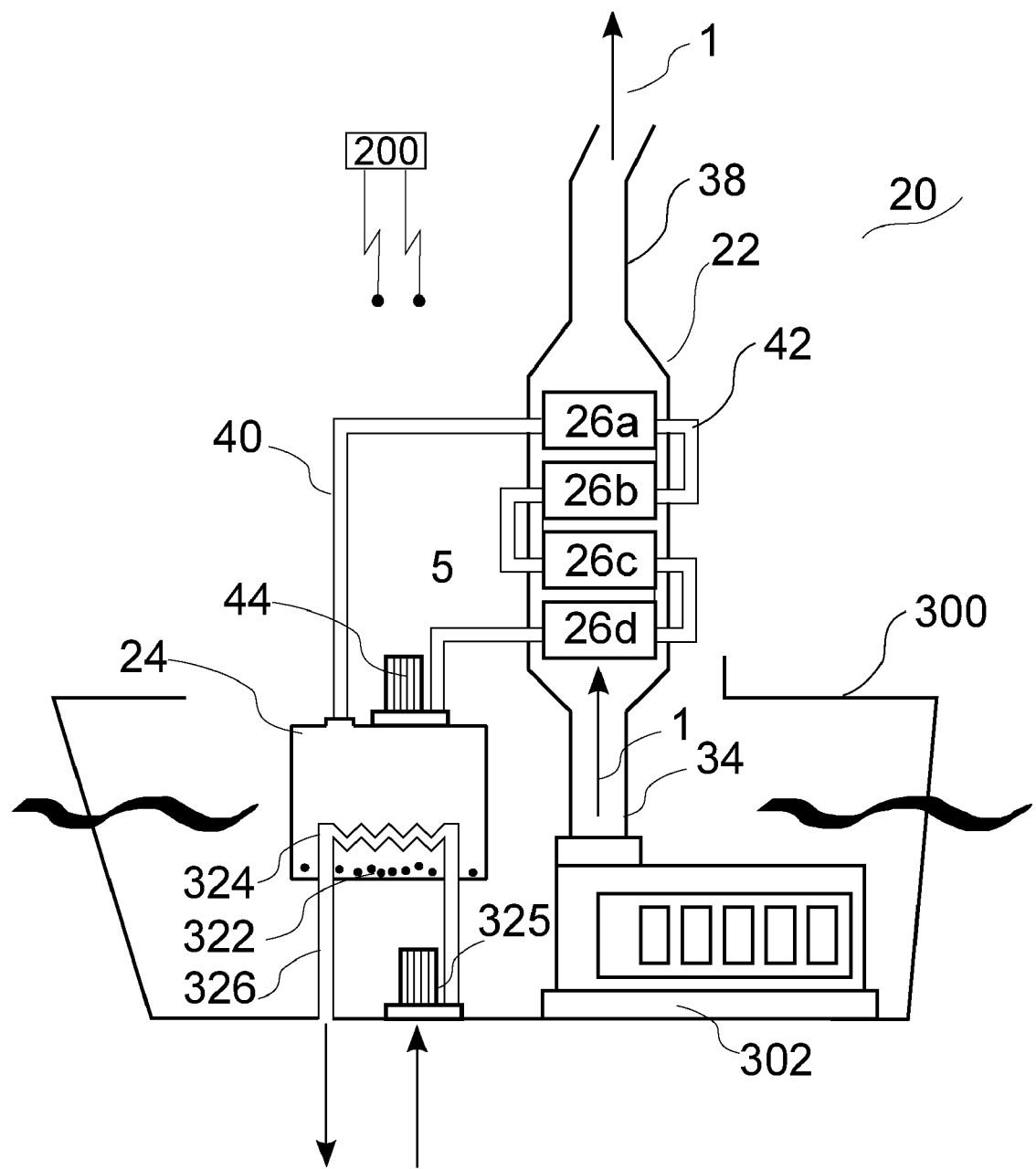
FIG. 9 is a schematic view a gas treatment system according to a third embodiment of the invention.

FIG. 9 depicts a "closed loop" version of system 20 wherein the carrier liquid 72 consists of a fifty percent (50%) V:V NaOH:water solution which is cycled through system 20. In this embodiment, engine exhaust is channeled through gas absorption unit 22 which in this example comprises four TEG absorption modules 26a-d. Unsaturated carrier liquid from desorption vessel 24 is pumped through absorption unit 22 by variable speed pump 44 and circulated sequentially through modules 26a-d. Pump 44 is in turn controlled by a pump controller in operative communication with controller 200. Within absorption unit 22, the heat from the engine exhaust 1 elevates the temperature of the carrier liquid and causes it to absorb TEG compounds 68 such as sulfur oxides, which dissolve into solution within carrier liquid 72. The acidic sulfur oxide molecules are neutralized within the sodium hydroxide carrier solution. Within desorption vessel 24, the carrier liquid 72 is cooled, which causes the dissolved TEG's to precipitate out as solid precipitates 322. If the TEG comprises sulfur oxides, the precipitates comprise sulfides. The precipitates 322 accumulate in the bottom of vessel 24 and can be removed periodically for on-shore disposal. The cooling of carrier liquid 72 within desorption vessel 24 may be performed by a heat exchanger 324. Water from the surrounding environment is circulated through heat exchanger 324 by pump 325, through water pipes 326. Pump 325 is controlled by pump controller 328, which is in operative communication with controller 200.

Figure 10:
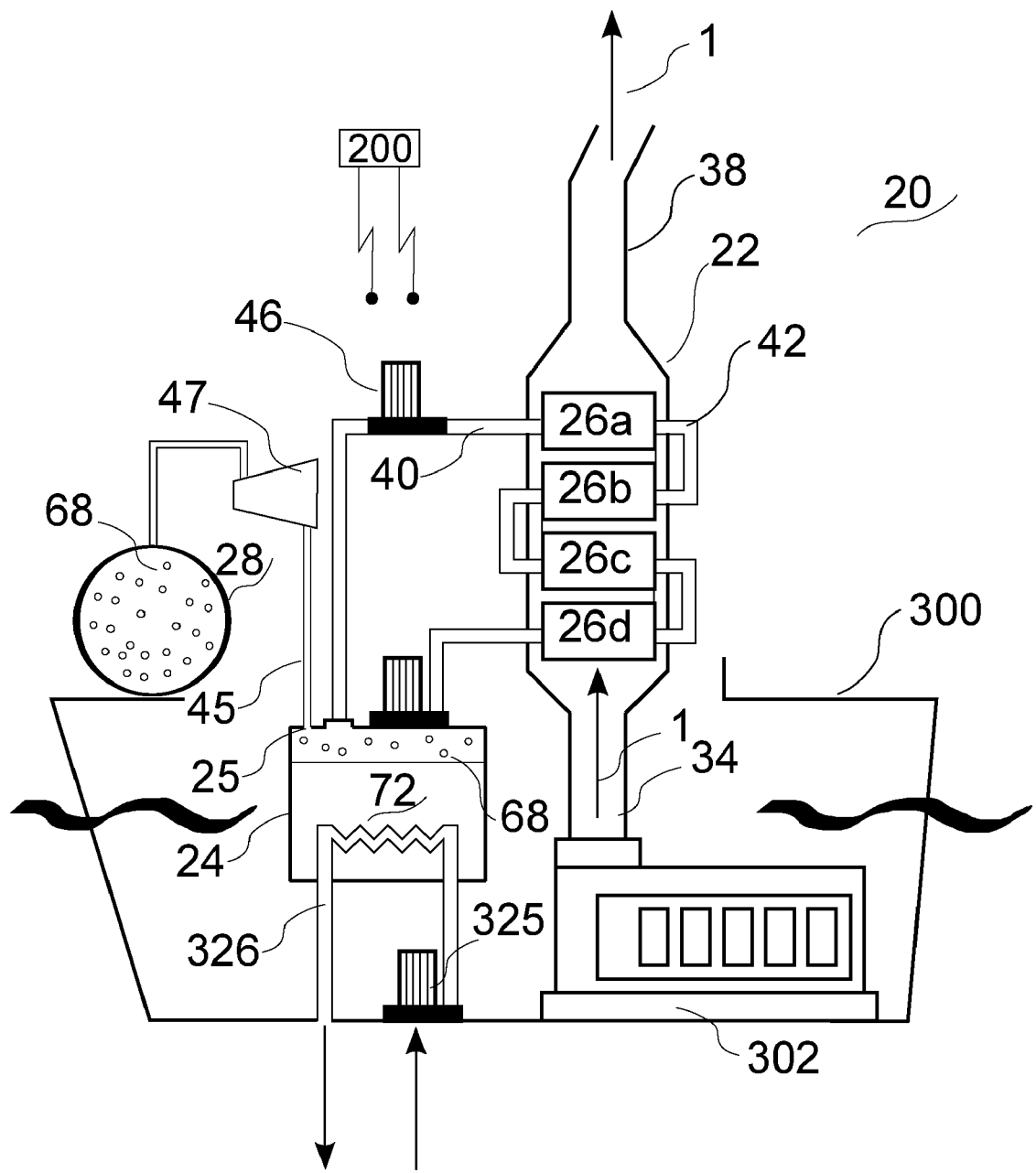
FIG. 10 is a schematic view a gas treatment system according to a fourth embodiment of the invention.

FIG. 10 depicts an embodiment of system 20 wherein unsaturated carrier liquid 72 is pressurized by pump 46 and enters absorption unit 22 through inlet conduit 40. The carrier flows in sequence through multiple absorption modules 26a-d. The now-saturated carrier then flows through discharge conduit 42 where it is pressurized by pump 44 and enters into desorption vessel 24. Within desorption vessel 24, the carrier liquid is subjected to conditions whereby the absorbed TEG compounds 68 degas from liquid 72, for example by reducing the pressure within vessel 24. The separated TEG compounds 68 are released in a gas phase through opening 25 of vessel 24 into conduit 45. The TEG gasses are pressurized by compressor 47 into storage vessel 28. The unsaturated carrier is then pumped back into absorption unit 22 through inlet conduit 40. The embodiment of FIG. 10 is configured to operate in a "zero discharge" mode, wherein the circulating carrier liquid can be an ionic liquid.

Figure 11:
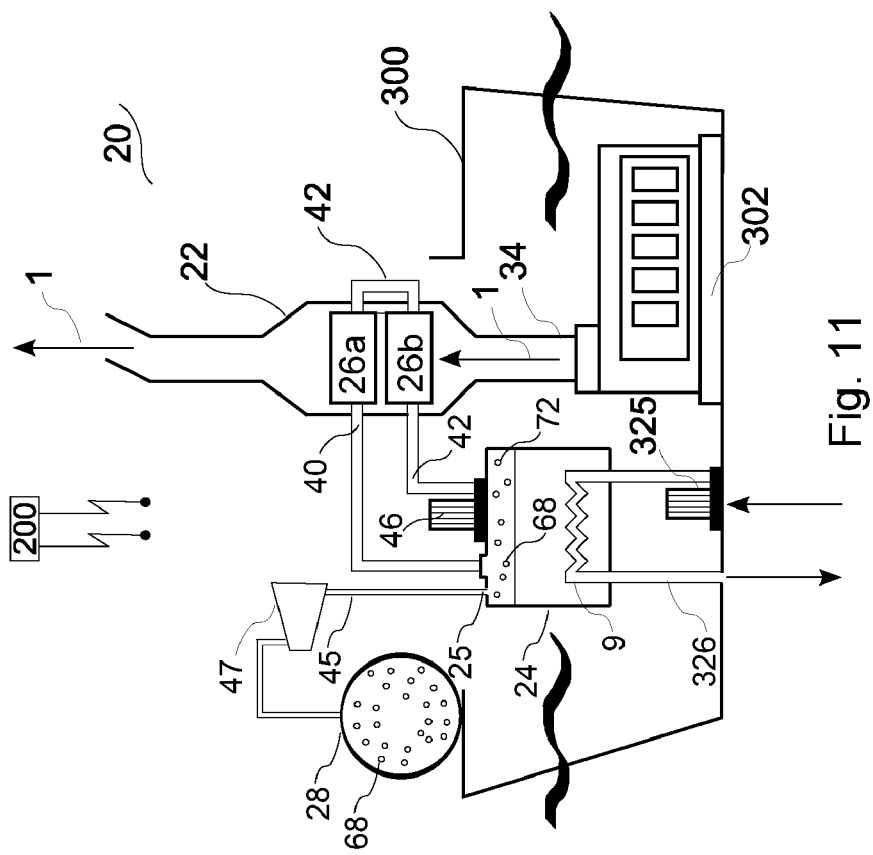
FIG. 11 is a schematic view a gas treatment system according to a fifth embodiment of the invention.

FIG. 11 depicts an embodiment similar to FIG. 10, with two absorption modules 26a and 26b. Carrier liquid becomes saturated within modules 26a and 26b. The saturated carrier liquid is piped via conduit 42 into desorption vessel 24 where it is de-gassed by means of de-pressurizing the liquid. The unsaturated liquid is recirculated through modules 26a and 26b via conduit 40. In this embodiment, a single pump 46 is provided to circulate the carrier liquid through the system and degassing of the saturated carrier liquid is performed solely by depressurizing liquid within vessel 24.

Figure 12:
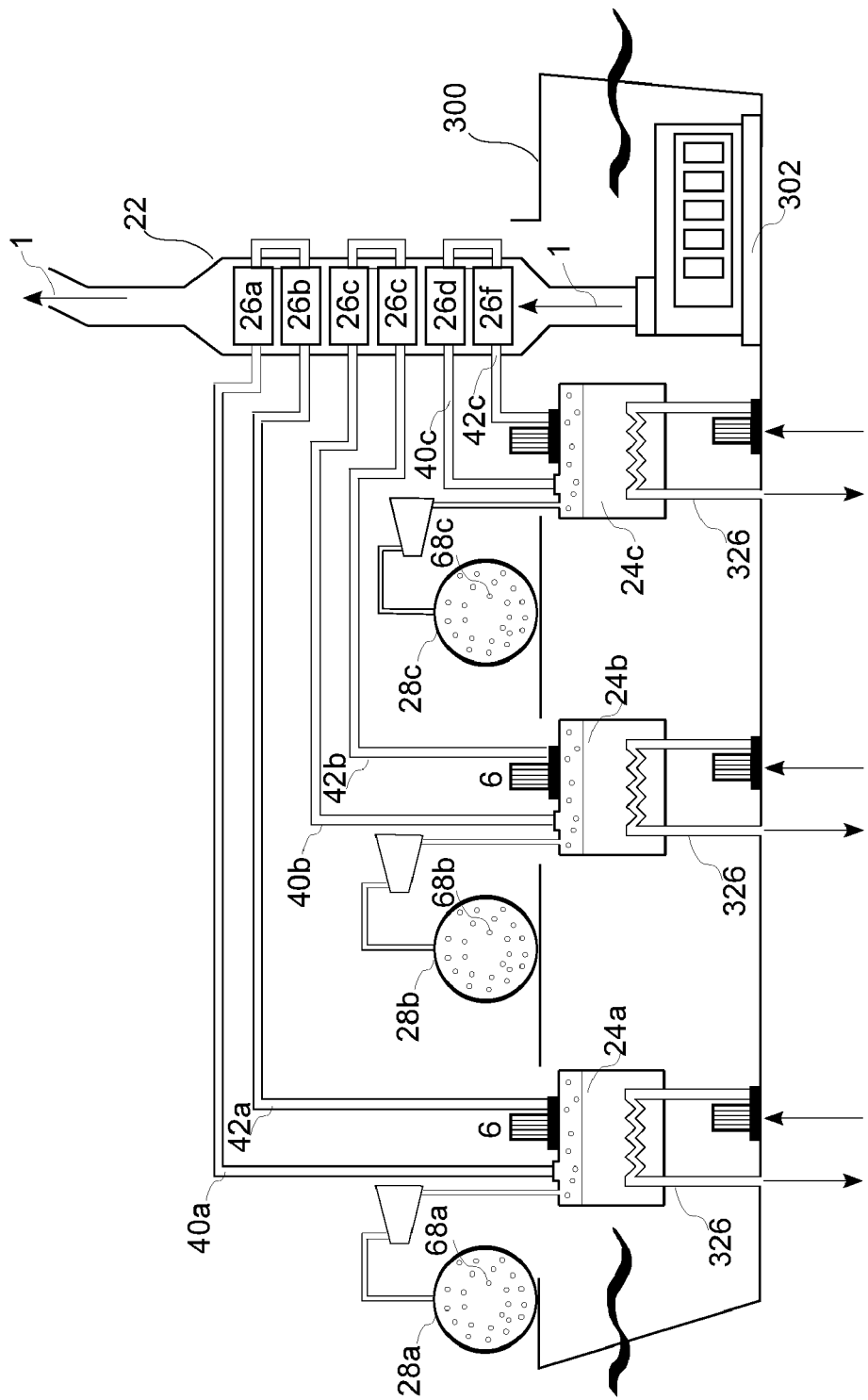
FIG. 12 is a schematic view a gas treatment system according to a sixth embodiment of the invention.

FIG. 12 depicts an embodiment of system 20 configured to independently separate and store multiple selected TEG's in a zero discharge mode wherein the selected TEG's are independently removed and stored. In this embodiment, absorption unit comprises 6 absorption modules, 26a-f. The modules are arranged in three pairs, 26a and 26b being a first pair, 26c and 26d being a second pair, and so forth. Each pair of modules is configured to channel carrier in series through the respective modules of the pair. Different carrier liquids are circulated through the respective pairs of modules in independent circuits to individually separate selected TEG's. A first closed carrier liquid loop comprises a first carrier inlet 40a which circulates carrier through modules 26a and 26b. The saturated carrier from the first loop is then discharged into discharge conduit 42a into first desorption vessel 24a. Within vessel 24a, a first TEG 68a is separated from the carrier liquid and is pressurized into first gas storage vessel 28a. A second closed loop comprises conduits 40b and 42b, which circulate unsaturated carrier through a second pair of modules 26 c and d and a second desorption vessel 24b. A second gas storage vessel 28b is provided to store a second TEG 68b. A third closed loop is similar in configuration for separating and storing a third TEG 68c. Carrier liquid 72 flows back to modules 26a-f through pipes 42a-c to complete the three independent fluid circuits. The respective carrier liquids may comprise three different ionic liquids, selected to absorb specific TEG's. For example, the carrier liquids may comprise: 1) i-Butyl-3-methylimidazolium methylsulfate [BMIm][MeS04] for absorbing SOx, 2) i-butyl-3-methyl-imidazolium hexafluorophosphate ([C4mim][PF6]) for absorbing $CO_2$, and 3) i-Butyl-3-methylimidazolium trifluoromethanesulfonate [BMIM]OTf for absorbing NOx.

Figure 18:
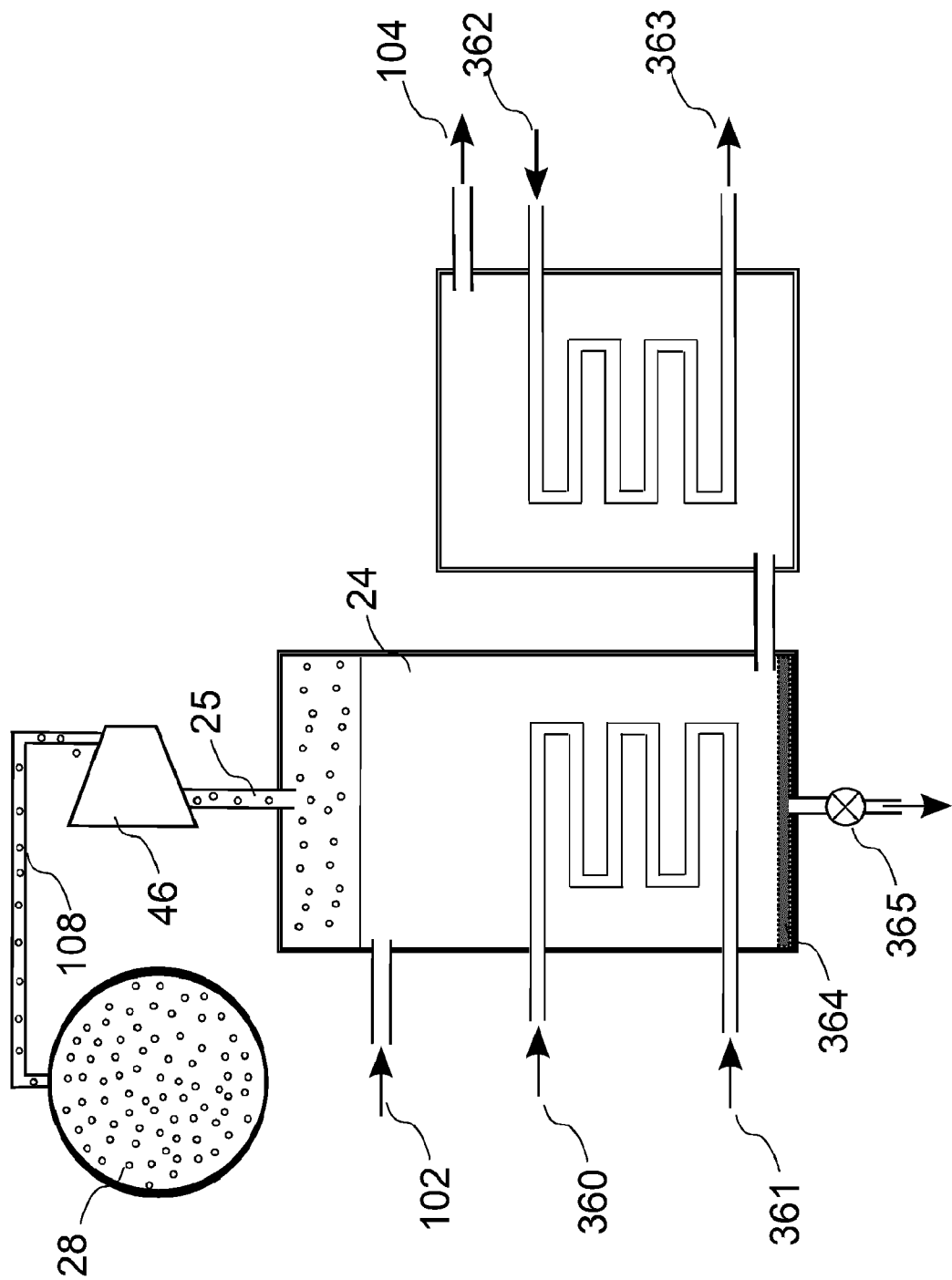
FIG. 18 is a schematic view of a gas desorption vessel according to a further aspect of the invention.

A further alternative embodiment of a TEG desorption system is shown in FIG. 18. In this embodiment, saturated carrier liquid enters a desorption chamber 24 through inlet conduit 102 which outlets into vessel 24 at an upper portion thereof. A pressure drop on entering chamber 24 causes the liquid to degas to release the TEG's. The gas-phase TEG's are then discharged through conduit 25 and are pumped by compressor 46 through conduit 108 into storage vessel 28. The liquid within chamber 24 is cooled by circulating a coolant fluid through a sealed pipe within chamber 25. The coolant fluid enters via pipe 360 and is discharged by pipe 361. Unsaturated carrier liquid exits chamber 24 adjacent its base, and enters into a secondary vessel. The carrier liquid is further cooled within the secondary vessel by additional coolant fluid which is circulated through a sealed pipe within the interior of the secondary vessel. The additional coolant enters via pipe 362 and exits via pipe 363. The cooled carrier liquid then exits the secondary vessel through discharge conduit 104, for circulation within one or more gas absorption modules 26, not shown.

The carrier used in the "zero discharge mode" embodiments may be a Task Specific Ionic Liquid "TSIL". The TSIL comprises a reversible carrier. This permits the TEG+TSIL solution 7 (IL with TEG dissolved therein) to be separated in the desorption vessels 28a-c by the application of differential pressure, temperature and/or electric potential.

Treatment system 20 is normally able to operate at engine pressure. In some cases, system 20 can generate excessive back pressure, depending on the engine design or manufacturer-imposed requirements and the number of other systems that contribute to back pressure such as turbo units, heat exchangers, pipe bends etc. If the back pressure exceeds a predetermined maximum, a booster fan 10 can be provided to boost the exhaust pressure upstream of system 20 to reduce back pressure imposed by system 20.

In one embodiment, heat from the engine exhaust is extracted with a heat exchanger prior to entering housing 64. This provides two benefits. The first is that temperature of the marine exhaust is lowered to within the lower operating temperatures of certain polymer membranes and TSILs. The second benefit is to apply the captured heat energy to provide the differential temperature to dissociate the TEGs+TSILs. The overall thermal efficiency of the system is improved, reducing the energy to operate the system.

The desorption vessel 24 is operated at near vacuum pressure to improve the dissociation rate of the TEGs and TSILs. An electric potential may also be applied to improve the dissociation of the TEGs and TSILs.

The TEGs are freed as a gas within the desorption vessels 24 a-c, and collected and stored in a pressurized vessels 28a-c, or combined as a compound for storage as a solid. The TSILs remains as a liquid within the desorption vessels 24a-c. The TSIL is then pumped back to the gas absorption unit 22.

A supplemental amount of TSIL may be added periodically from a storage vessel to replace any TSIL lost through evaporation or chemical decomposition.

As shown schematically in FIG. 13, absorption system 20 comprises monitors and detectors described below that monitor selected system operating parameters and transmit the resulting data to controller 200 during operation of the system. These include: an upstream liquid pressure detector 56 which is measures carrier pressure prior to entry into membrane modules 26; multiple downstream liquid pressure detectors 58 which measure carrier pressure downstream of each membrane assemblies, wherein the detected difference between pressures represents a pressure drop occurring largely within a respective membrane assembly 66; and multiple pH sensors 54 located downstream of respective membrane assemblies 66 for measuring the pH of carrier exiting each membrane module 26. Optionally, a pH sensor can be provided upstream of membrane modules 26 to detect the pH level of the carrier liquid prior to flowing through the membrane modules 26 thereby allowing a determination of the pH difference.

The control system 200 for operation of gas treatment system 20 is described below. The operation of system 20 is configure to optimize the mass transfer or absorption exhaust gas to ensure that the exhaust gas sufficiently contacts the membrane exterior surface to permit it to be absorbed through the membrane, utilizing principles of mass transfer, or Henry's Law. Control system 200 comprises in general terms a computer processor that includes a random access memory (RAM), a data storage module such as a hard drive and a user interface 330 comprising display and a data entry terminal. Control system 200 is in operative communication via wireless or wired data communication links with the sensors and detectors described herein and the various controllable components described herein including the adjustable valves, pumps, compressors and other adjustable components described herein that permit operation of gas treatment system 20.

Figure 13:
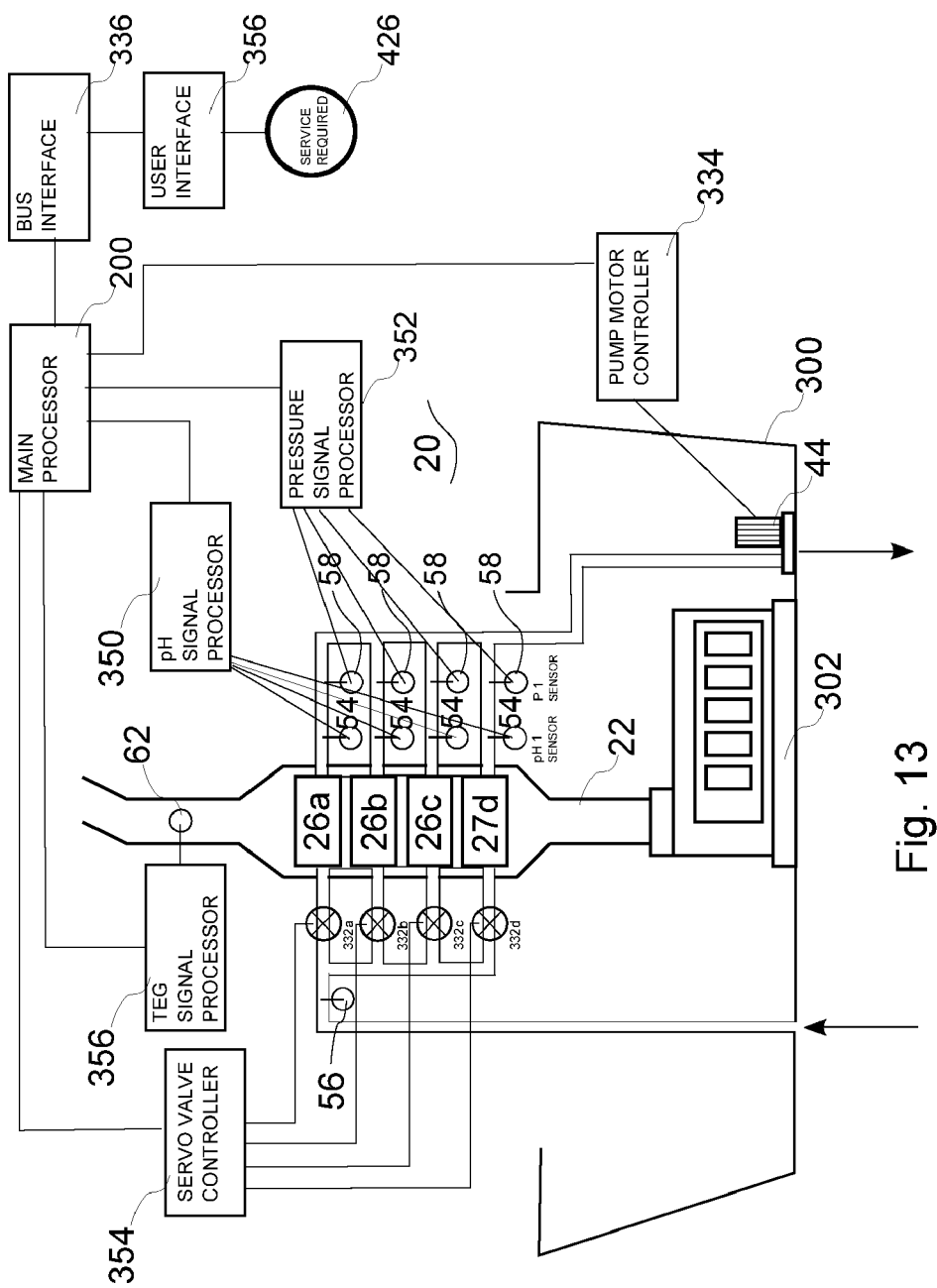
FIG. 13 is a schematic view a gas treatment system according to an embodiment of the invention, showing in particular system control means.

As seen in FIG. 13, multiple pH sensors 54 and pressure sensors 58 are provided within respective carrier discharge conduits 42. pH sensor 54 transmits data to pH signal processor 350 and pressure sensor 58 transmits data to pressure signal processor 352. The respective signal processors can comprise independent units in communication with controller 200 or incorporated therein. Carrier liquid valves 332a-d are provided within respective carrier inlet conduits 40 to control carrier flow into respective absorption modules 26 a-d. Valves 332a-d are independently controlled by a servomotor value controller 354. A TEG level sensor 62 is provided within exhaust discharge conduit 38 to detect the level(s) of selected TEG's. A TEG signal processor 356 is responsive to signals generated by TEG level sensors 62. A pump motor controller 334 is associated with water pump 44 to control operation of pump 44. The above detectors, sensors and controllers and operationally linked to the main processor of control system 200, which in turn is operationally linked to a user interface 356 via a system bus 336.

Figure 14:
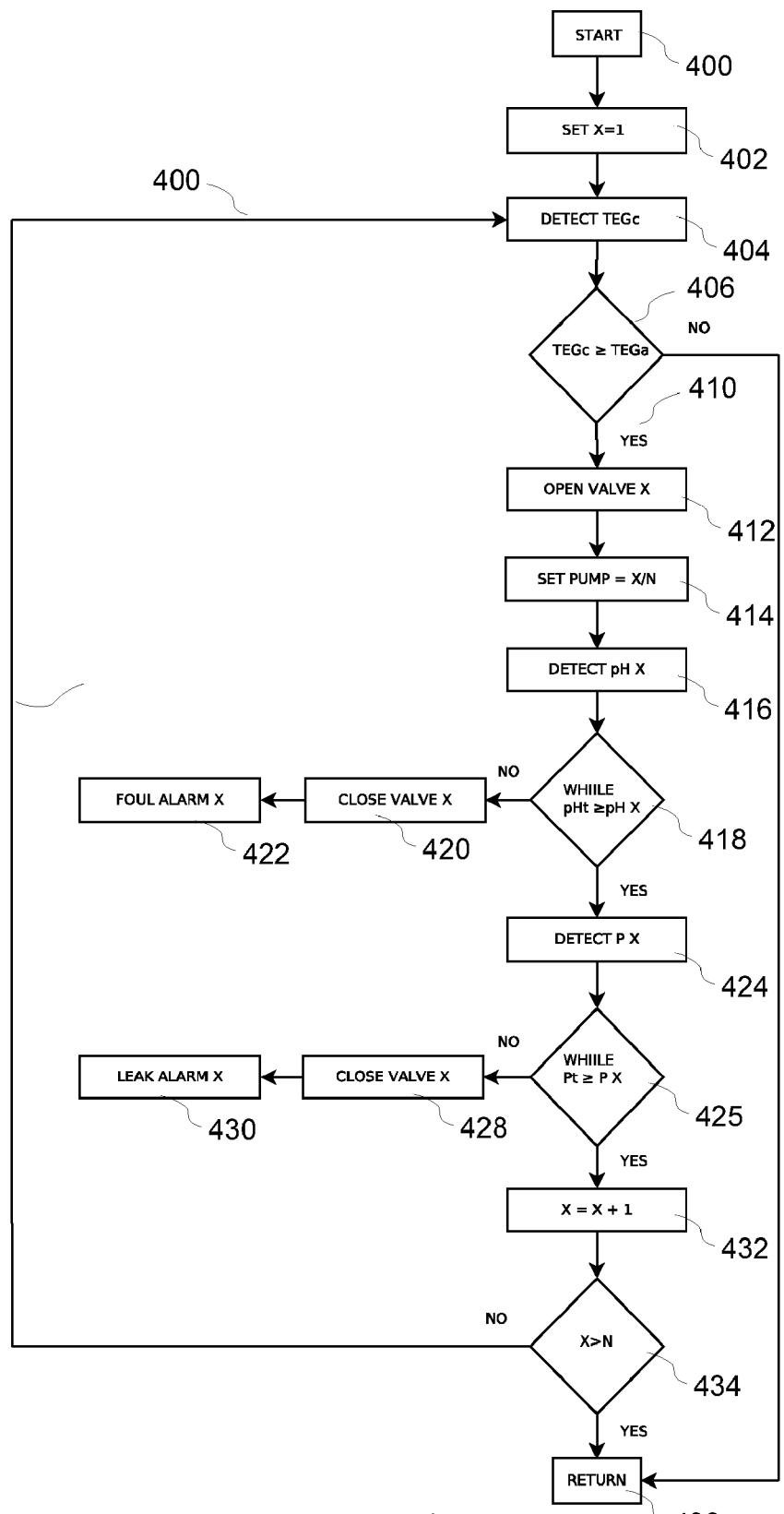
FIG. 14 is flow chart showing operation of the control system according to one embodiment of the invention.

FIG. 14 is a flowchart showing operation of control system 200. In this figure:

TEGc=Target Emission Gas Concentration as measured with sensor 62 at the funnel (exhaust outlet) after passing through the absorption unit 22.

TEGa=Target Emission Gas allowable limit, for example 25 ppm for SOX.

X=index for the counter, which tracks the numbers of gas absorption modules 26 that are in operation and non-operative.

N=total number of modules 26 available for use in system 20, for example N=20 modules for 8 MW engine.

Control system 200 operates initializes operation of the system and monitors the performance of absorption modules 20 according to the following steps:

1. At step 400, power-on control system 200 from standby mode. This step may be taken either before or after the vessel engine is powered on.

2. At step 402, enter into control system 200 form the user interface the total number of gas absorption modules 26 available in the system. This step may be pre-programmed into the control system. If not previously performed, the normal operating pressure of modules 26 may also be entered.

3. At step 404, measure the TEGc with gas sensor 62 and compare this value to the TEGa at step 406. Step 406 further comprises a determination of the number of modules of system 20 that should be actuated for system 20 to operate at an optimal efficiency level. For example, the system may contain 20 modules, and control system 200 may determine that only 15 modules are required to provide the target TEG reduction.

4. If the untreated engine exhaust contains a low level of TEG's below a selected value (TEGc is less than TEGa), the system will not turn on and the system returns to standby mode at step 408. If the TEGc levels exceed the TECa value, the system is put into operation at 410.

5. If the system is put into operation, liquid flow valve 332*a* for a first module 26*a* is actuated at 412 and the liquid pump 44 is actuated at step 414 to run at 1/N speed. This provides variable speed control. For example, if the system contains 20 modules, and control system 200 determines that only 15 modules are required to provide the target TEG reduction, then pump 44 is run at $^{15}/_{20}$ of full operational speed, thereby reducing the power requirements for operating the system. The system then performs tests on the selected number of modules according to the steps described below. Pumps 312 are controlled by pump controller 314 which is a unit that is either responsive to controller 200 or incorporated therein.

6. The pH of the liquid solution is measured at the exit of the first absorption module 26*a* by pH sensor 54 at step 416. This value is indicated as pHx in FIG. 14. This pH level is compared to a predetermined value at step 418. When acidic gases such as SOX, NOX, COX are extracted into the liquid, this acidifies the liquid circulating through the membranes. The level of acidification is used to determine whether the membrane assembly has become fouled and incapable of absorbing TEG's wherein a pH drop that exceeds a target level (pHt) is indicative of fully functional membranes and a pH drop that fails to exceed this level is indicative of a membrane assembly that has become fouled. This can avoid the need to visually inspect the membranes. If the pH difference is less than 0.1 across a module, this is indicative that acidic gases are not being absorbed by the modules 26 and the membranes therein are fouled. For reference, seawater pH is typically limited to a range between 7.5 and 8.4.

7. If pH X fails to reach pHt, indicative of fouling of membrane assembly 66*a*, then valve 332*a* is turned off at step 420, shutting off the unit, and the SERVICE REQUIRED indicator 426 is actuated at step 422. This sends a signal to service the affected module. Optionally, the signal may be sent to both an on-board monitor and also a wirelessly transmitted signal to an on-shore operator who can then arrange for a replacement module at the next port of call of the vessel. If the pH detected at step 416 remains less than pHt, then the system proceeds to step 424.

8. At step 424, carrier pressure is measured at the membrane outlet side (Px) within carrier discharge conduit. At step 425, this pressure is compared with the input pressure detected by pressure sensor 56 to determine a pressure drop. A pressure drop that exceeds a predetermined level (pressure tolerance level, Pt) is indicative of a leak, for example caused by a broken tube or seal.

9. If there is a leak, or broken tube, the control system will close the valve at step 428 and sound an alarm at step 430. This can send a satellite signal to the next port of call to schedule service to the system.

10. If no excessive pressure drop is detected, the above steps are repeated for subsequent modules 26*b*, *c* etc. (X=X+ i) at steps 432 and 434 to determine whether any of these modules are fouled or leaking. Once the above steps have been performed for the optimal number of modules required for operation at the target efficiency, as determined at step 406, controller 200 continues to run the system, as shown at step 408, with this number of modules and at the corresponding pump speed for optimum efficiency.

Tests have been performed to show operational results obtained with the present system. The results of such tests are summarized in the graphs described below.

Figure 15:
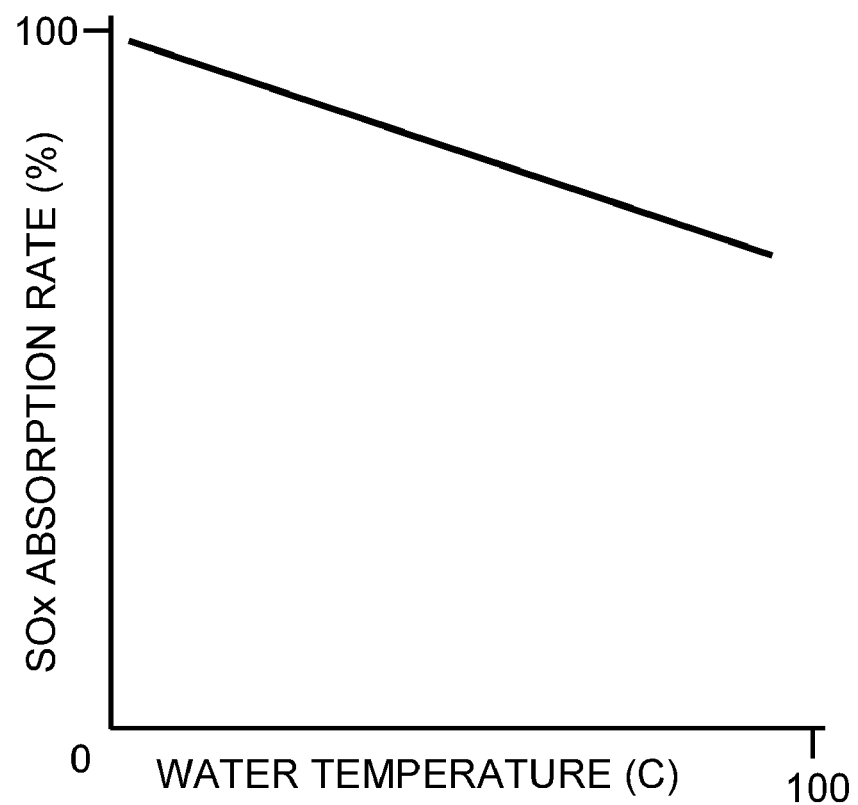
FIG. 15 is a graph showing the influence of water temperature on SOx absorption rate within a gas absorption module of the invention.

FIG. 15 shows the effect of water carrier temperature on absorption rate of SOX. A lower water temperature increases absorption rate.

Figure 16:
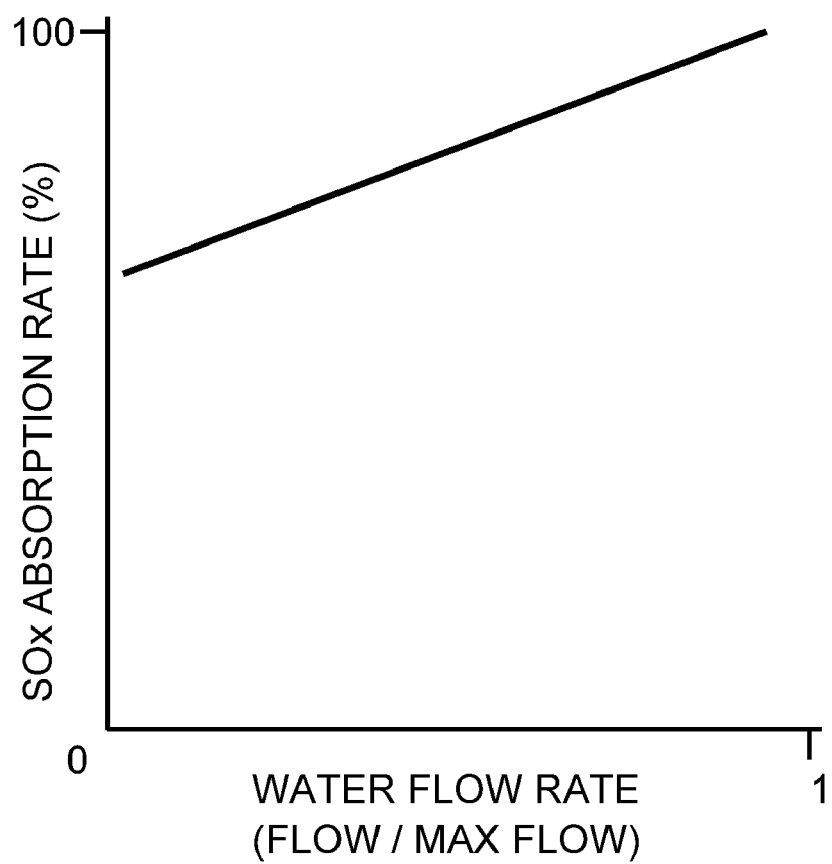
FIG. 16 is a graph showing the influence of water flow rate through the hollow fiber membrane array on SOx absorption rate within a gas absorption module of the invention.

FIG. 16 shows the effect of water (carrier) flow rate on the absorption rate of SOX. A faster flow rate increases absorption rate.

Figure 17:
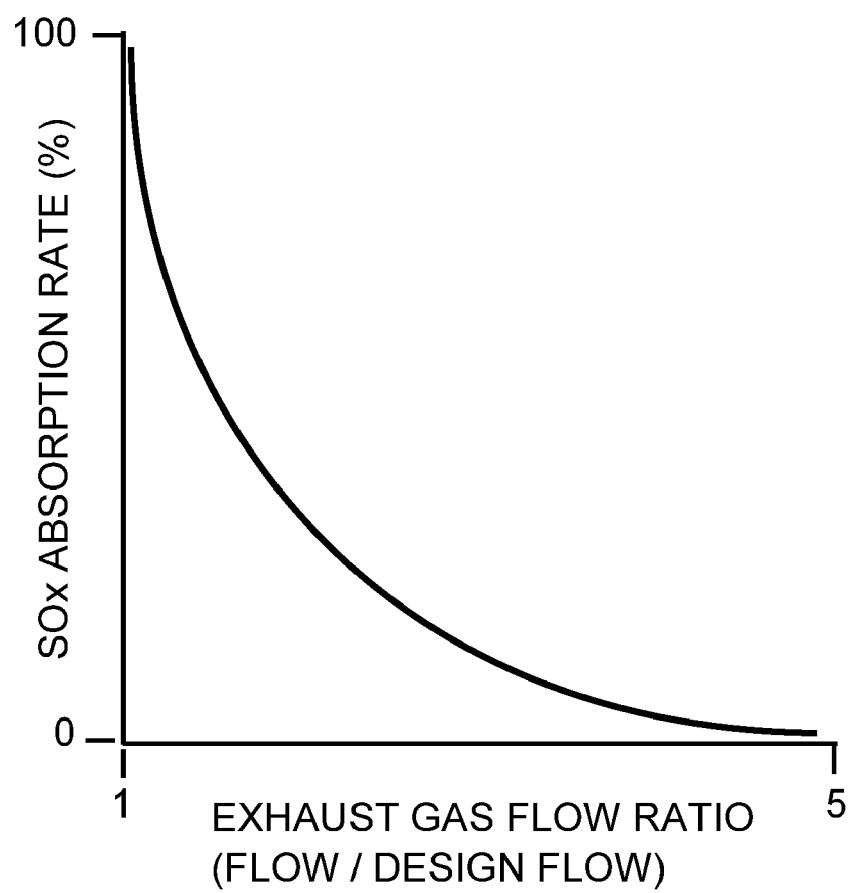
FIG. 17 is a graph showing the influence of the exhaust gas flow ratio (actual flow/design flow rate) on SOx absorption rate within a gas absorption module of the invention.

FIG. 17 shows the relationship between exhaust gas flow and absorption rate of SOX. The efficiency drops as the flow rate increases above the predetermined "design" flow rate.

The invention is not intended to be limited to the embodiments described herein, but rather the invention is intended to be applied widely within the scope of the inventive concept as defined in the specification as a whole including the appended claims.

What is claimed is:

1. A method for reducing the concentration of a target emission gas (TEG) from a source of engine exhaust gas comprising the steps of:

directing said engine exhaust gas from the source into an enclosed space containing at least one array of hollow fiber semi-permeable ceramic membranes, wherein said exhaust gas contacts an exterior surface of said membranes whereupon TEG within said exhaust gas permeates through said membrane thereby lowering the concentration of said TEG within said exhaust gas;

circulating a carrier liquid capable of retaining TEG compounds through bores of said hollow fiber ceramic membranes thereby elevating the concentration of said TEG compounds within said carrier liquid, wherein said carrier liquid is a basic solution and said TEG compounds comprise an acid which is neutralized by said carrier liquid when contacted thereby;

discharging said exhaust gas containing a reduced TEG concentration from the enclosed space and removing said carrier liquid containing said TEG compounds therein from said hollow fiber ceramic membrane array for discharge or recycling; and precipitating said TEG compounds from said carrier liquid in the form of a precipitate and recycling said carrier liquid through said membranes.

2. The method of claim 1 wherein said carrier liquid comprises NaOH, and said steps of precipitating comprises cooling said carrier liquid.

3. A method for reducing the concentration of a target emission gas (TEG) from a source of engine exhaust gas comprising the steps of:

directing said engine exhaust gas from the source at engine pressure into an enclosed space containing at least one array of hollow fiber semi-permeable ceramic membranes, wherein said exhaust gas contacts an exterior surface of said membranes whereupon TEG within said exhaust gas permeates through said membrane thereby lowering the concentration of said TEG within said exhaust gas;

circulating a carrier liquid capable of retaining TEG compounds through bores of said hollow fiber ceramic membranes thereby elevating the concentration of said TEG compounds within said carrier liquid, wherein the carrier liquid is a task-specific ionic liquid specific to said TEG;

discharging said exhaust gas containing a reduced TEG concentration from the enclosed space and removing said carrier liquid containing said TEG compounds therein from said hollow fiber ceramic membrane array for discharge or recycling; and determining the concentration of TEG within untreated exhaust gas, determining an optimal rate of liquid flow required to reduce the TEG concentration in said untreated gas to a target level and selectively controlling the rate of liquid flow through said membrane array to match said optimal rate of liquid flow.

4. The method of claim 3 further comprising the step of determining the effectiveness of said membrane array at reducing the concentration of said TEG in said exhaust gas by determining whether said liquid passing through said array experiences one or both of a pressure drop that exceeds a predetermined level or a pH drop that is less than a predetermined level.

5. The method of claim 4 wherein said membrane array comprises a module housed in a module housing wherein said liquid is circulated through a selected number of said modules based on a determination of the level of TEG concentration in said exhaust gas and/or the flow rate of said exhaust gas and wherein said modules may be selectively activated or deactivated in response to said determination.

6. A method for reducing the concentration of a target emission gas (TEG) from an untreated source of marine diesel engine exhaust gas comprising the steps of:

directing said untreated engine exhaust gas from the source at engine pressure into an enclosed space containing at least one array of hollow fiber semi-permeable ceramic membranes, wherein said exhaust gas contacts an exterior surface of said membranes whereupon TEG within said exhaust gas permeates through said membrane thereby lowering the concentration of said TEG within said exhaust gas;

circulating a carrier liquid capable of retaining TEG compounds through bores of said hollow fiber ceramic membranes thereby elevating the concentration of said TEG compounds within said carrier liquid where the carrier liquid is a task-specific ionic liquid specific to said TEG;

discharging said exhaust gas containing a reduced TEG concentration from the enclosed space;

separating said TEG compounds from said carrier liquid and recycling said carrier liquid through said membrane array; wherein said carrier liquid is a basic solution and said TEG compounds comprises an acid which is neutralized by said carrier liquid when contacted thereby, and said separation comprises precipitating said TEG compounds from said carrier liquid in the form of a precipitate; and determining the concentration of TEG within untreated exhaust gas, determining an optimal rate of liquid flow required to reduce the TEG concentration in said untreated gas to a target level and selectively controlling the rate of liquid flow through said membrane array to match said optimal rate of liquid flow.

7. The method of claim 6 further comprising the step of reducing the temperature of the engine exhaust gas before it enters the enclosed space.

8. The method of claim 1 wherein said carrier liquid comprises NaOH.

* * * * *